US010725714B2

(12) United States Patent
Mori

(10) Patent No.: US 10,725,714 B2
(45) Date of Patent: Jul. 28, 2020

(54) IMAGE PROCESSING APPARATUS, CONTROL METHOD, AND NON-TRANSITORY RECORDING MEDIUM FOR CONTROLLING DISPLAY OF A SELECTION SCREEN FOR SELECTION OF AN ALTERNATE MAIL SERVER UPON FAILURE OF A PRIMARY MAIL SERVER

(71) Applicant: Akihiro Mori, Kanagawa (JP)

(72) Inventor: Akihiro Mori, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 16/182,688

(22) Filed: Nov. 7, 2018

(65) Prior Publication Data

US 2019/0212957 A1 Jul. 11, 2019

(30) Foreign Application Priority Data

Jan. 5, 2018 (JP) ................................ 2018-000724

(51) Int. Cl.
*G06F 15/00* (2006.01)
*G06K 15/00* (2006.01)
*G06K 1/00* (2006.01)
*G06F 3/12* (2006.01)

(52) U.S. Cl.
CPC .......... *G06F 3/1222* (2013.01); *G06F 3/1236* (2013.01); *G06F 3/1238* (2013.01); *G06F 3/1288* (2013.01)

(58) Field of Classification Search
CPC .... G06F 3/1222; G06F 3/1236; G06F 3/1238; G06F 3/1288

USPC .............. 358/1.1, 1.14, 1.13, 1.15
See application file for complete search history.

(56) References Cited

U.S. PATENT DOCUMENTS

| | | | |
|---|---|---|---|
| 8,281,125 B1 * | 10/2012 | Briceno | .................. H04L 51/08 |
| | | | 713/153 |
| 2007/0214494 A1 | 9/2007 | Uruta et al. | |
| 2009/0228807 A1 * | 9/2009 | Lemay | ................ G06F 3/04817 |
| | | | 715/752 |

FOREIGN PATENT DOCUMENTS

| | | |
|---|---|---|
| JP | 2007-241939 | 9/2007 |
| JP | 2007-316694 | 12/2007 |

\* cited by examiner

*Primary Examiner* — Douglas Q Tran
(74) *Attorney, Agent, or Firm* — Harness, Dickey & Pierce, P.L.C.

(57) ABSTRACT

An image processing apparatus includes circuitry to store, in a memory, primary address information indicating an address of a primary mail server and alternate address information indicating one or more addresses of corresponding one or more alternate mail servers. The circuitry performs authentication of a user and transmits, after the authentication succeeds, the e-mail using the primary mail server based on the primary address information, in response to a first transmission request for transmission using the primary mail server. When transmission using the primary mail server fails, the circuitry controls display of a selection screen for selecting one from the one or more alternate mail servers, based on the alternate address information and transmits, in response to a second transmission request for transmission using the alternate mail server, the e-mail using the one selected from the one or more alternate mail servers on the selection screen.

13 Claims, 18 Drawing Sheets

Please input SMTP server addresses.

| SMTP Server Address (Primary) | 192.168.10.10 |
| SMTP Server Address (Alternate) | 192.168.10.11 | } 300
| SMTP Server Address (Alternate) | 192.168.10.12 |

Add SMTP Server Address (Alternate)    [ + ]  } 301-1

[ Set ] 302   [ Cancel ] 303

FIG. 5

| Settings Set by Administrator (Medium Group) | Settings Set by Administrator (Small Group) | IP Address |
|---|---|---|
| File Transfer Settings | SMTP Primary Server | 192.168.10.10 |
|  | SMTP Alternate Server 1 | 192.168.10.11 |
|  | SMTP Alternate Server 2 | 192.168.10.12 |
|  | ⋮ | ⋮ |

| NO. | ADDRESS BOOK OF USER | AUTHORITY TO USE ALTERNATE SERVER |
|---|---|---|
| 1 | ADDRESS BOOK OF USER A | AUTHORIZED |
| 2 | ADDRESS BOOK OF USER B | AUTHORIZED |
| 3 | ADDRESS BOOK OF USER C | AUTHORIZED |
| 4 | ADDRESS BOOK OF USER D | UNAUTHORIZED |
| 5 | ADDRESS BOOK OF USER E | UNAUTHORIZED |
| ⋮ | ⋮ | ⋮ |

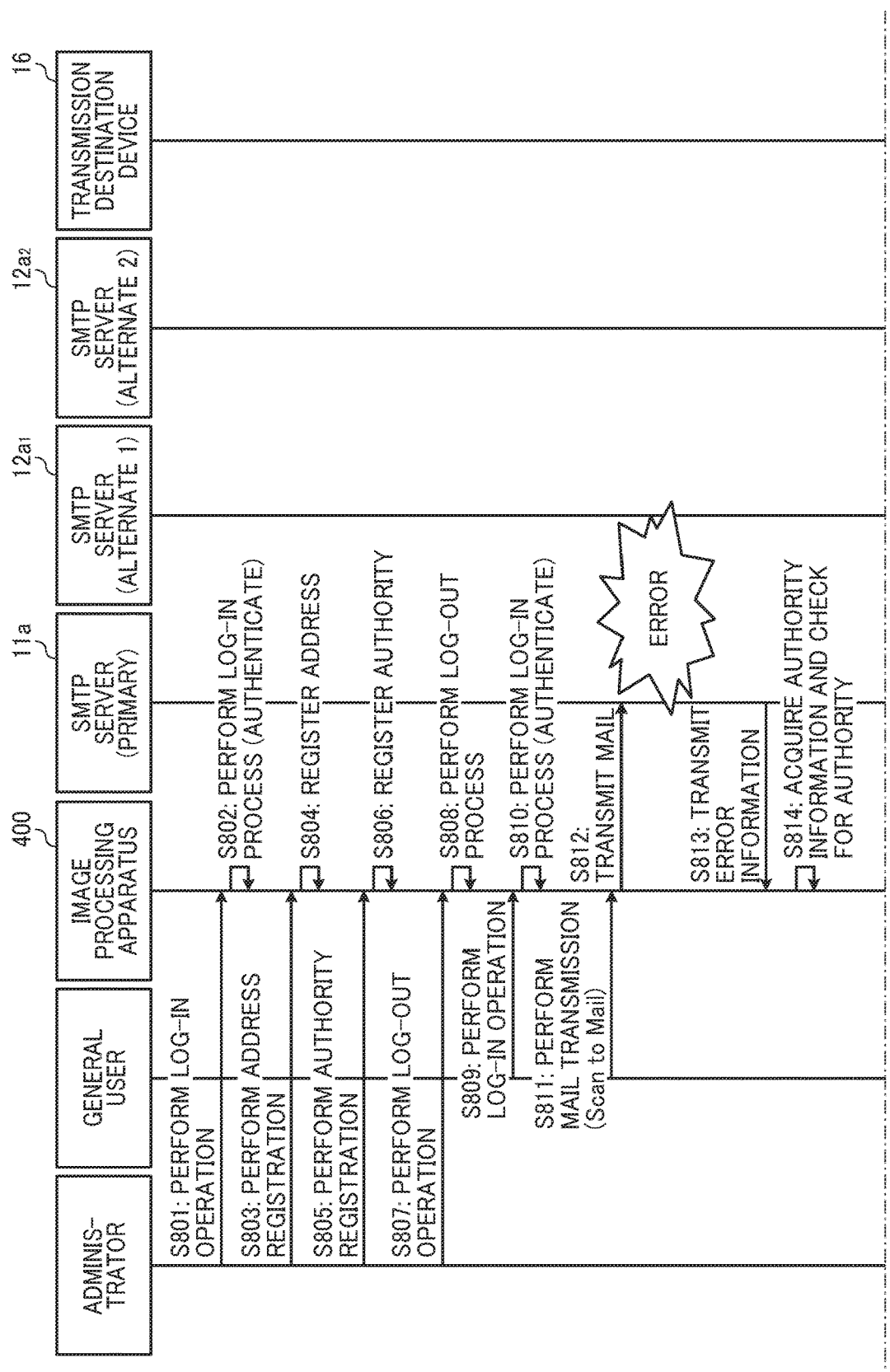

FIG. 20

| NO. | DATE AND TIME | ALTERNATE SERVER ADDRESS | TRANSMISSION RESULT | REMARKS |
|---|---|---|---|---|
| 1 | 2016/06/20 20:00:00 | 192.168.10.30 | FAILED | FAILED TO CONNECT TO SERVER |
| 2 | 2016/06/20 20:07:00 | 192.168.10.40 | SUCCESSFUL | |
| 3 | 2016/06/25 22:00:00 | 192.168.10.30 | FAILED | FAILED TO CONNECT TO SERVER |
| 4 | 2016/06/25 22:04:00 | 192.168.10.50 | SUCCESSFUL | |
| ... | ... | ... | ... | ... |

IMAGE PROCESSING APPARATUS, CONTROL METHOD, AND NON-TRANSITORY RECORDING MEDIUM FOR CONTROLLING DISPLAY OF A SELECTION SCREEN FOR SELECTION OF AN ALTERNATE MAIL SERVER UPON FAILURE OF A PRIMARY MAIL SERVER

CROSS-REFERENCE TO RELATED APPLICATION

This patent application is based on and claims priority pursuant to 35 U.S.C. § 119(a) to Japanese Patent Application No. 2018-000724, filed on Jan. 5, 2018, in the Japan Patent Office, the entire disclosure of which is hereby incorporated by reference herein.

BACKGROUND

Technical Field

Embodiments of the present disclosure relate to an image processing apparatus, a control method, and a non-transitory recording medium storing instructions for executing the control method.

Related Art

In an image processing apparatus, such as a multi-function peripheral (MFP), there is a known technique for securing security by collectively giving authority to an administrator who manages a system to manage device settings.

The administrator having such authority can operate administrator menus after being authenticated, for example.

SUMMARY

An exemplary embodiment of the present disclosure includes an image processing apparatus including circuitry to perform authentication of a user and store, in a memory, primary address information indicating an address of a primary mail server and alternate address information indicating one or more addresses of corresponding one or more alternate mail servers. The circuitry further transmits, after the authentication of the user succeeds, in response to a first transmission request, the electronic mail by using the primary mail server based on the primary address information stored in the memory. The first transmission request is a request for transmission of the electronic mail using the primary mail server. The circuitry further controls display of a selection screen to be displayed on a display based on the alternate address information stored in the memory, in response to a notification indicating that transmission of the electronic mail by using the primary mail server fails. The selection screen is used for selecting one from the one or more alternate mail servers. The circuitry further transmits, in response to a second transmission request, the electronic mail by using the one selected from the one or more alternate mail servers on the selection screen. The second transmission request is a request for transmission of the electronic mail by using the alternate mail server.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 4 is an illustration of a setting screen for setting primary address information and alternate address information, according to the first embodiment of the disclosure;

FIG. 5 is a conceptual diagram illustrating an example of address setting information stored in a storage unit according to the first embodiment of the disclosure;

FIG. 18A and FIG. 18B are a sequence diagram illustrating an example of a process performed by a system according to the fourth embodiment of the disclosure;

FIG. 20 is a conceptual diagram illustrating an example of history information stored in a storage unit according to the fifth embodiment of the disclosure.

Figure 1:
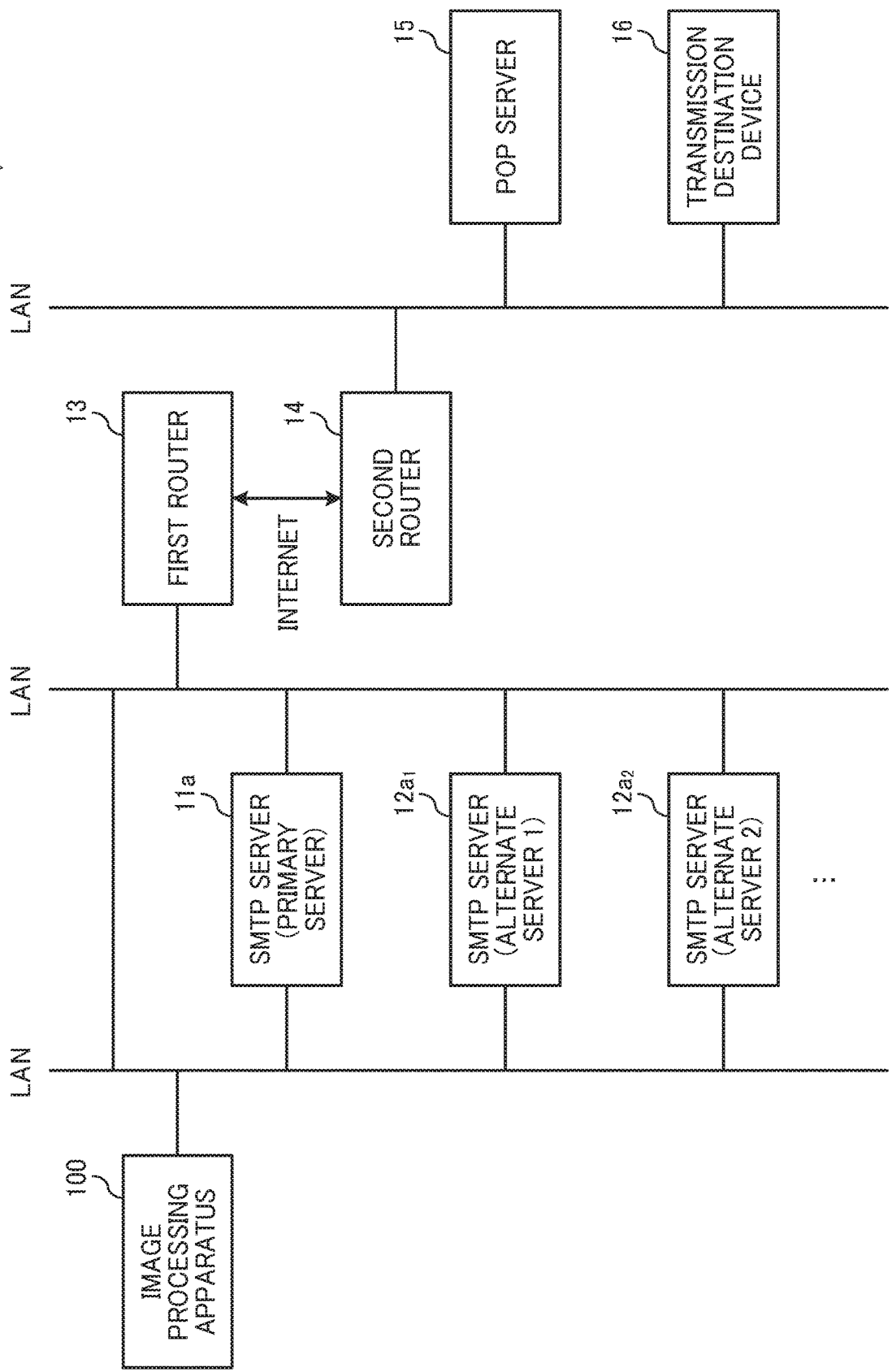
FIG. 1 is a block diagram illustrating an example of a configuration of a system including an image processing apparatus according to a first embodiment of the disclosure.

The accompanying drawings are intended to depict example embodiments of the present disclosure and should not be interpreted to limit the scope thereof. The accompanying drawings are not to be considered as drawn to scale unless explicitly noted.

DETAILED DESCRIPTION

The terminology used herein is for describing particular embodiments only and is not intended to be limiting of the present disclosure. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof. In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operation in a similar manner, and achieve a similar result.

An image processing apparatus, a control method, a non-transitory recording medium, and an electronic apparatus, according to one of the embodiments of the present disclosure are described below with reference to the attached drawings. The embodiments Described here, however, are not intended to be limiting of the present disclosure. In addition, one or more embodiments can be appropriately combined with another one or more embodiments within a scope of the disclosure.

First Embodiment

A configuration of a system 1 including an image processing apparatus 100 according to a first embodiment is described below with reference to FIG. 1.

FIG. 1 is a diagram illustrating an example of the configuration of the system 1 including the image processing apparatus 100 according to the first embodiment.

As illustrated in FIG. 1, the system 1 includes the image processing apparatus 100, a simple mail transfer protocol (SMTP) server 11a, at least one SMTP server 12a, and a first router 13. The above-mentioned devices are connected to a network such as a local area network (LAN), for example. In the example of FIG. 1, the at least one SMTP server 12a includes a SMTP server $12a_1$ and a SMTP server $12a_2$. Hereinafter, the SMTP server $12a_1$ and the SMTP server $12a_2$ are collectively or individually referred to as the "SMTP server 12a" or the "SMTP servers 12a", unless being required to distinguish from each other. The SMTP server 11a corresponds to a "primary mail server", which is usually used. The SMTP server 12a corresponds to "an alternate mail server".

In addition, the system 1 includes a second router 14, a post office protocol (POP) server 15, and a transmission destination device 16. The above-mentioned devices are connected to a network such as a LAN, for example. The first router 13 and the second router 14 establish a communication through the Internet, for example.

In the configuration described above, the image processing apparatus 100 has a function of acquiring data of a document by scanning the document and transmitting the data to the transmission destination device 16 by electronic mail (e-mail). Hereinafter, this function is referred to as a Scan to Mail (E-Mail) function. More specifically, when the Scan to Mail function is executed in the system 1, the SMTP server 11a is usually used, and the transmission destination device 16 receives the e-mail via the first router 13, the second router 14, and the POP server 15, namely the transmission destination device 16 receives the e-mail by POP reception. In a case where the SMTP server 11a fails to transmit the e-mail, one of SMTP servers 12 is used to transmit the e-mail in the system 1.

The image processing apparatus 100 stores, in a storage unit, primary address information indicating an address (for example, an internet protocol (IP) address) of the SMTP server 11a and an alternate address information indicating one or more addresses of the corresponding one or more SMTP servers 12a by an operation of an administrator, for example. In addition, the image processing apparatus 100 receives an execution request to execute the Scan to Mail function by an operation of a general user. Upon receiving the execution request (first transmission request), the image processing apparatus 100 transmits an e-mail by using the SMTP server 11a based on the primary address information stored in the storage unit. The process performed by the image processing apparatus 100 ends, when the transmission of the e-mail by using the SMTP server 11a is successful.

On the other hand, when the transmission of the e-mail by using the SMTP server 11a fails, the image processing apparatus 100 displays a selection screen for selecting one of the one or more SMTP servers 12a, based on the alternate address information stored in the storage unit. The selection screen also includes information indicating that transmission of the e-mail by using the SMTP server 11a has failed. The general user operates the displayed selection screen and selects one of the one or more SMTP servers 12a to be used. Thus, the image processing apparatus 100 receives a transmission request (second transmission request) to transmit the e-mail by using the SMTP server 12a selected by the selection operation of the general user and transmits the e-mail by using the selected SMTP server 12a.

That is, the image processing apparatus 100 allows the administrator to set a primary mail server and one or more alternate mail servers in advance and allows the general user to select one of the one or more alternate mail servers to be used to transmit an e-mail in a case where the primary mail server has failed to transmit the e-mail. The image processing apparatus 100, accordingly, can suppress the interference to the user's work while ensuring the security.

A hardware configuration of the image processing apparatus 100 according to the first embodiment is described below with reference to FIG. 2.

Figure 2:
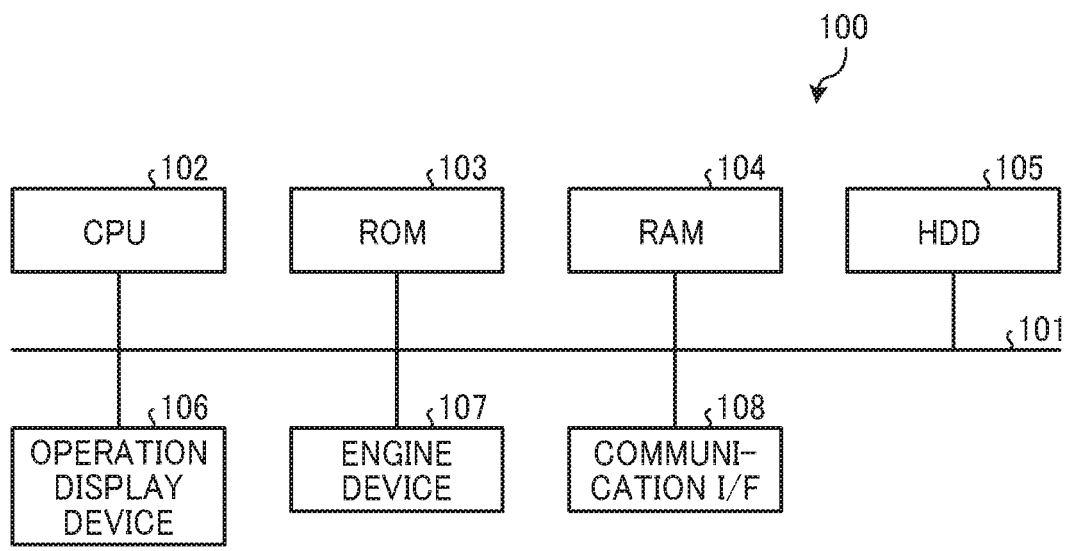
FIG. 2 is a block diagram illustrating an example of a hardware configuration of the image processing apparatus according to the first embodiment of the disclosure.

FIG. 2 is a block diagram illustrating an example of the hardware configuration of the image processing apparatus 100 according to the first embodiment.

As illustrated in FIG. 2, the image processing apparatus 100 includes a central processing unit (CPU) 102, a read only memory (ROM) 103, a random-access memory (RAM) 104, and a hard disk drive (HDD) 105. The image processing apparatus 100 also includes an operation display device 106, an engine device 107, and a communication interface (I/F) 108. The above-mentioned hardware components are connected to each other through a system bus 101.

The CPU 102 controls the overall operation of the image processing apparatus 100. The CPU 102 executes a program stored in the ROM 103 or the HDD 105 using the RAM 104 as a work area to control the overall operation of the image processing apparatus 100 and implement the functions, which are described later, of the image processing apparatus 100. The image processing apparatus 100 is, for example, a multifunction peripheral (MFP) capable of implementing a copying function (copying), a scanning function (scanning), a facsimile communication function, a printing function (printing), and the like. In the present embodiment, the scan function is used when the Scan to Mail function is executed.

The operation display device 106 receives user operations including an operation of the administrator and an operation of one or more general users and various inputs according to the user operations. The operation display device 106 also displays various types of information including, for example, information according to a received operation, information indicating an operating state of the image processing apparatus 100, and information indicating a setting state. The operation display device 106 includes, for example, a liquid crystal display device (LCD) implementing a touch panel function. In addition to or in place of the LCD, the operation display device 106 may also be provided with an operation unit such as a hardware key and a display unit such as a lamp.

The engine device 107 is a hardware component that performs processing to implement the copying function, the scanning function, the facsimile communication function, and the printing function, but not general-purpose information processing and communication. For example, the engine device 107 includes a scanner that scans an image of a document (an image scanning unit), a plotter that prints an image on a sheet material such as a sheet of paper (an image forming unit), and a facsimile device that performs facsimile communication. In addition, the engine device 107 may further include an optional unit (hardware component), such as a finisher that sorts printed sheet materials and an automatic document feeder (ADF) that automatically feeds documents to be scanned.

The communication I/F 108 is an interface that connects the image processing apparatus 100 to a network, such as the Internet. In the present embodiment, the communication 108 may be used for establishing a communication between the image processing apparatus 100 and one of the SMTP server 11*a* and the SMTP servers 12*a*, for example.

A functional configuration of the image processing apparatus 100 according to the first embodiment is described below with reference to FIG. 3.

Figure 3:
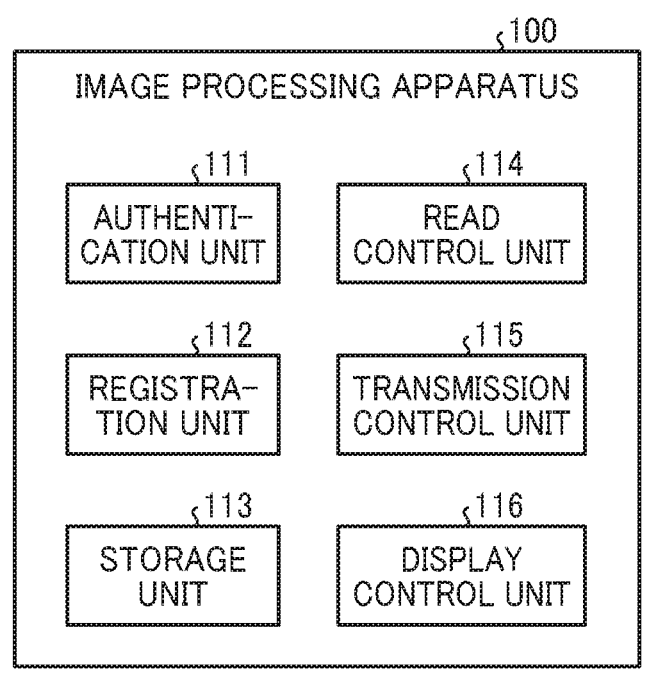
FIG. 3 is a block diagram illustrating an example of a functional configuration of the image processing apparatus according to the first embodiment of the disclosure.

FIG. 3 is a block diagram illustrating an example of the functional configuration of the image processing apparatus 100 according to the first embodiment.

As illustrated in FIG. 3, the image processing apparatus 100 includes an authentication unit 111, a registration unit 112, a storage unit 113, a read control unit 114, a transmission control unit 115, and a display control unit 116. A part or all of the above-mentioned functional components other than the storage unit 113 may be implemented by a hardware circuit or software (a program) executed.

The authentication unit 111 performs authentication of a user. In the present embodiment, the authentication of a user includes authentication of the administrator and authentication of a general user. More specifically, the authentication unit 111 performs authentication of the administrator according to a login operation (for example, input of a user name, a password, etc.) performed using the operation display device 106 by the administrator. When the authentication for the administrator is successful, the administrator having administrator authority, can set various settings and cause the registration unit 112 to perform processing, for example. A detailed description of the processing performed by the registration unit 112 is deferred. The various settings settable by the administrator include, for example, registration of user information corresponding to the one or more general users, setting of whether or not to execute the authentication of the one or more general users, and setting of restrictions for the one or more general users to use the image processing apparatus 100.

The authentication unit 111 also performs authentication of the general user according to a login operation performed using the operation display device 106 by the general user (for example, input of a user name, a password, etc.). When the authentication of the general user is successful, the general user can cause the read control unit 114, the transmission control unit 115, and the display control unit 116 to perform processing, for example. A detailed description of the processing performed by the read control unit 114, the transmission control unit 115, and the display control unit 116 is deferred. The authentication of the general user may be performed using a user code that is commonly used by some of the general users (a group of users, etc.) by associating the user code with an address book. That is, the authentication of the general user may be performed for each user code, instead of each user. In addition, the authentication of the general user may be performed in a manner that, for example, user information (individual) is associated with an address book to authenticate in an individual basis (for each user). In addition, any other known authentication method may be used for the authentication of the general user to allow the user logs in.

The registration unit 112 registers the primary address information and the alternate address information in the storage unit 113. More specifically, the registration unit 112 registers the primary address information indicating an address of the primary mail server and the alternate address information indicating one or more addresses of the one or more alternate mail servers in the storage unit 113. In the example of the present embodiment, the administrator, who has logged in, uses the operation display device 106 to perform an operation for registering the primary address information and the alternate address information. After the authentication unit 111 successfully authenticates the administrator, the registration unit 112 receives the primary address information and the alternate address information according to the operation performed using the operation display device 106 by the administrator. Then, the registration unit 112 registers the primary address information and the alternate address information so that the storage unit 113 stores the primary address information and the alternate address information.

In the present embodiment, the SMTP server 11*a* is set to the primary mail server and the SMTP servers 12*a* are set to the alternate mail servers. This means that the administrator sets the SMTP server to the primary mail server and the SMTP servers 12*a* to the alternate mail servers. In other words, the SMTP server Ha does not always have to be set to the primary mail server, and any one of the SMTP servers 12*a* may be set to the primary mail server according to the settings set by the administrator.

FIG. 4 is an illustration of a setting screen G300 for setting the primary address information and the alternate address information, according to the first embodiment. As illustrated in FIG. 4, the operation display device 106 displays the setting screen G300 for inputting an address of the primary mail server and one or more addresses of the one or more alternate mail servers. The administrator operates the setting screen G300 and inputs the address of the primary mail server and the one or more addresses of the one or more alternate mail servers in input fields 301 of items of "SMTP server address (primary)" and "SMTP server address (alternate)", respectively. An additional input field 301-1 is used for adding an address of an alternate mail server by pressing an item of "Add SMTP server address (alternate)" and inputting an address to be added. Here in the description, to "press" an item, a button or the like, includes any action, such as to "touch", to "tap", performed using the operation display device 106 to select the item, the button or the like. When the addition or the input is completed, the administrator presses a "Set" button 302. As a result, the registration unit 112 registers the primary address information and the alternate address information input on the setting screen G300, and the storage unit 113 stores the primary address information and the alternate address information.

FIG. 5 is a conceptual diagram illustrating an example of address setting information stored in the storage unit 113 according to the first embodiment. As illustrated in FIG. 5, the storage unit 113 stores address setting information including an item of information indicating a type of mail server and an item of information indicating an IP address of each mail server, for file transfer settings. The items of the address setting information are set by the administrator. The file transfer settings are settings for transferring file data (settings for transmitting file data to the transmission destination device 16) in executing the Scan to Mail function.

In addition to the above-described items, the items to be set by the administrator include interface settings. Examples of the interface settings include, in relation to a network, an IPv4 address setting, an IPv4 subnet mask setting, an IPv6 address setting, an IPv6 subnet mask setting, a Domain Name System (DNS) address setting. In addition, the file transfer settings include, for example, an SMTP authentication setting, a user authentication setting for a POP before SMTP, a reception protocol setting, and a setting for a POP3 or an internet message access protocol (IMAP)4. Further, the file transfer settings include, for example, a setting for a mail address of an administrator, a setting for a mail communication port, a setting for an interval of time to receive mails, a setting for size limitation of a received mail, a setting for a server to retain a mail, and a setting for a user name and a password at a time of initially-transmitting a mail. The administrator sets the interface settings and the file transfer settings in advance. In addition, the registered administrator may be appropriately changed, or another administrator may be appropriately registered in addition to the current registered administrator.

Returning to FIG. 3, the read control unit 114 performs an image reading processing (performs the scanning function). More specifically, the read control unit 114 causes the engine device 107 to scan a document and generate image data when an execution request of the Scan to Mail function is received. The settings related to the scanning may be set in advance or may be set by a user (general user) each time to instruct to perform the scanning function. The generated image data is to be transmitted to the transmission destination device 16.

The transmission control unit 115 transmits an e-mail by using the primary mail server based on the primary address information. More specifically, the transmission control unit 115 acquires the primary address information stored in the storage unit 113 when receiving a transmission request (first transmission request) to transmit the e-mail by using the primary mail server according to the execution request to execute the Scan to Mail function. The transmission control unit 115, then, transmits the e-mail by using the primary mail server (e.g., SMTP server 11a) based on the acquired primary address information. The e-mail is transmitted via the communication I/F 108 under the control of the transmission control unit 115. In addition, the e-mail includes image data acquired by the scanning. Before the above-described operation, the general user has logged in and then, the general user operates the operation display device 106 to execute the Scan to Mail function. Thus, the read control unit 114 performs the scanning function, and the transmission control unit 115 performs the transmission of the e-mail.

The display control unit 116 displays a selection screen for selecting an alternate mail server. More specifically, the display control unit 116 acquires the alternate address information stored in the storage unit 113 when the transmission control unit 115 fails to transmit the e-mail by using the primary mail server. Then, the display control unit 116 displays the selection screen for selecting one of the one or more alternate mail servers (e.g., the SMTP servers 12a) based on the acquired alternate address information. The selection screen is displayed on the operation display device 106 under the control of the display control unit 116. The selection screen also includes information indicating that the transmission of the e-mail by using the primary mail server has failed.

Figure 6:
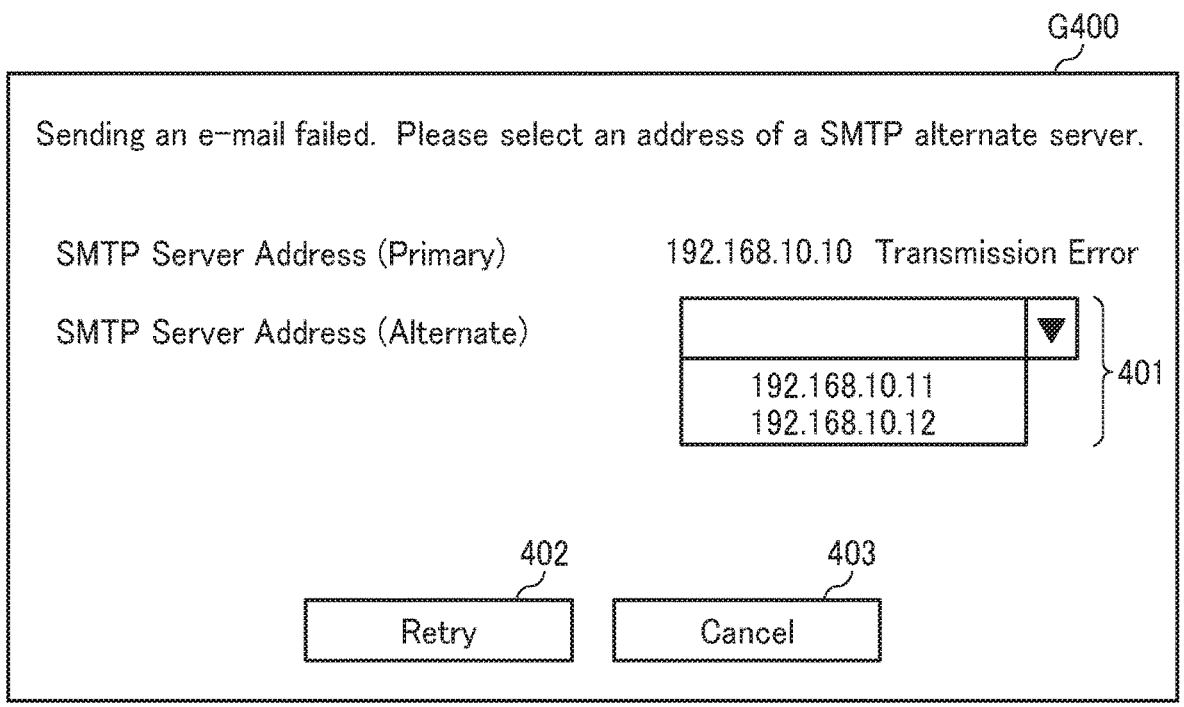
FIG. 6 is an illustration of an example of a selection screen according to the first embodiment of the disclosure.

FIG. 6 is an illustration of an example of the selection screen according to the first embodiment. As illustrated in FIG. 6, the operation display device 106 displays a selection screen G400 that includes the information indicating that the transmission of the e-mail by using the primary mail server has failed (error) and a combo box 401 for selecting one of the alternate mail servers, for example. This allows the general user to recognize that the transmission of the e-mail by using the primary mail server in executing the Scan to Mail function has failed and select one of the one or more alternate mail servers by operating the combo box 401.

In the example of the present embodiment, the general user presses a "Retry" button 402 after selecting one of the one or more alternate mail servers. Then, the e-mail is transmitted by using the selected alternate e-mail server. On the other hand, if the general user presses a "Cancel" button 403 to cancel the transmission of the e-mail by using the alternate mail server, the image processing apparatus 100 ends the processing according to the Scan to Mail function. A graphical user interface (GUI) for selecting one of the alternate mail servers is not limited to the combo box, but any other interface may be used as long as the user can select one item from one or more items. For example, a check box may be used to select one of the one or more alternate mail servers.

In the selection screen G400 illustrate in FIG. 6, when any alternate mail server is selected, and the "Retry" button 402 is pressed, the transmission control unit 115 performs the transmission of the e-mail by using the selected alternate mail server. More specifically, the transmission control unit 115 receives a transmission request (second transmission request) to transmit the e-mail by using the alternate mail server selected according to the operation performed on the selection screen G400 by the general user. Then, the transmission control unit 115 performs the transmission of the e-mail by using the alternate mail server (e.g., the SMTP server 12a). The e-mail is transmitted via the communication I/F 108 under the control of the transmission control unit 115.

Figure 7:
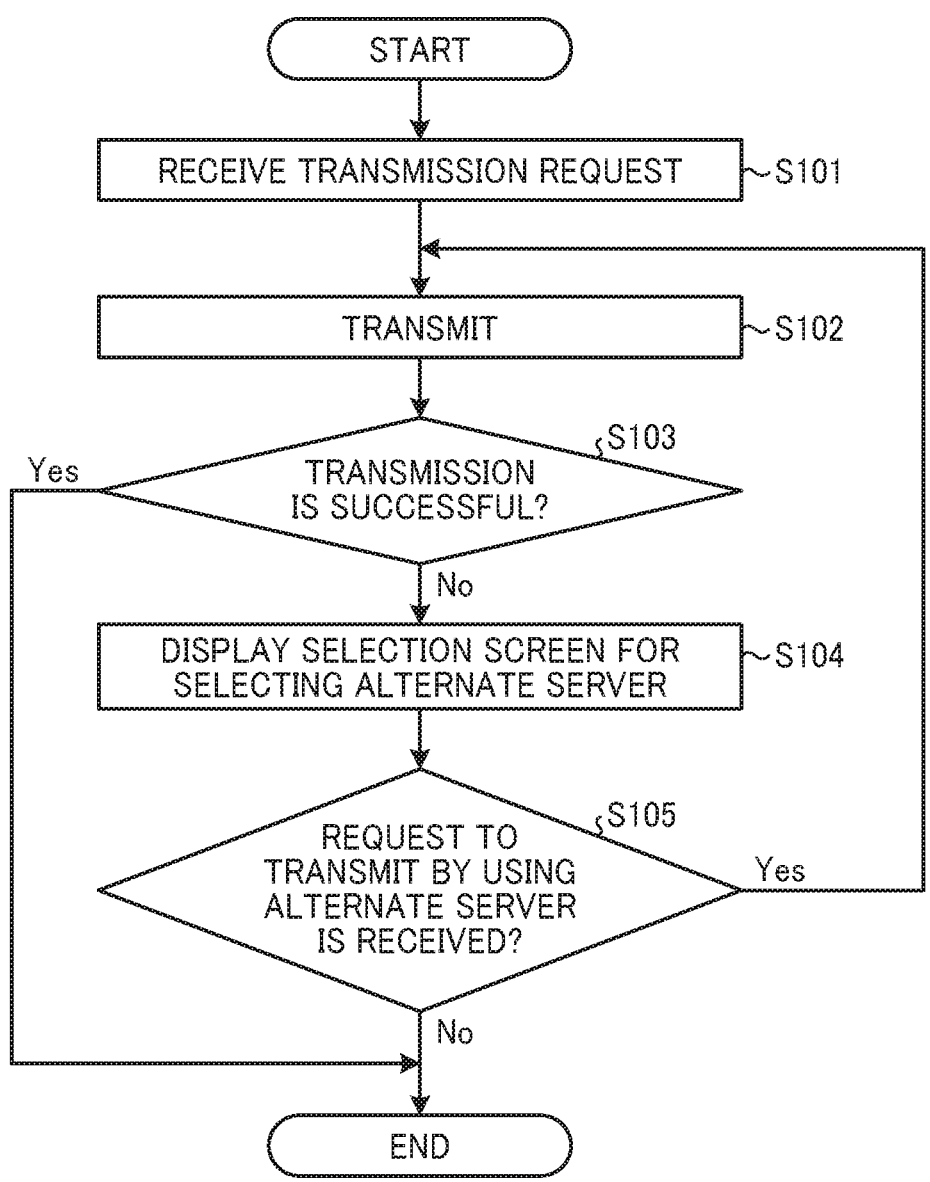
FIG. 7 is a flowchart illustrating an example of a process performed by the image processing apparatus according to the first embodiment of the disclosure.

A description is now given of a process performed by the image processing apparatus 100 according to the first embodiment, with reference to FIG. 7.

FIG. 7 is a flowchart illustrating an example of the process performed by the image processing apparatus 100 according to the first embodiment. In the example of FIG. 7, the primary address information and the alternate address information are set by the administrator in advance. In addition, in the example of FIG. 7, a general user performs a login operation and executes the Scan to Mail function after being successfully authenticated.

As illustrated in FIG. 7, the image processing apparatus 100 receives a transmission request (first transmission request) to transmit an e-mail by using the primary mail server, according to the execution of the Scan to Mail function (Step S101). Then, the image processing apparatus 100 transmits the e-mail by using the SMTP server 11a based on the primary address information stored in the storage unit 113, which is set to the primary mail server (Step S102). When the transmission of the e-mail by using the SMTP server 11a is successful (Step S103: Yes), the process performed by the image processing apparatus 100 ends.

On the other hand, when the transmission of the e-mail by using the SMTP server 11a fails (Step S103: No), the image processing apparatus 100 displays a selection screen for selecting one of the one or more alternate mail servers based on the alternate address information stored in the storage unit 113 (Step S104). The selection screen also includes information indicating that the transmission of the e-mail by using the SMTP server 11a has failed. Subsequently, when receiving a transmission request (second transmission request) to transmit the e-mail by using the SMTP server 12a, which is set to one of the one or more alternate mail servers, according to an operation performed on the selection screen (Step S105: Yes), the image processing apparatus 100 transmits the e-mail by using the selected SMTP server 12a (Step S102). On the other hand, when a request to cancel the transmission is received according to an operation performed on the selection screen (Step S105: No), the process performed by the image processing apparatus 100 ends.

Figure 8:
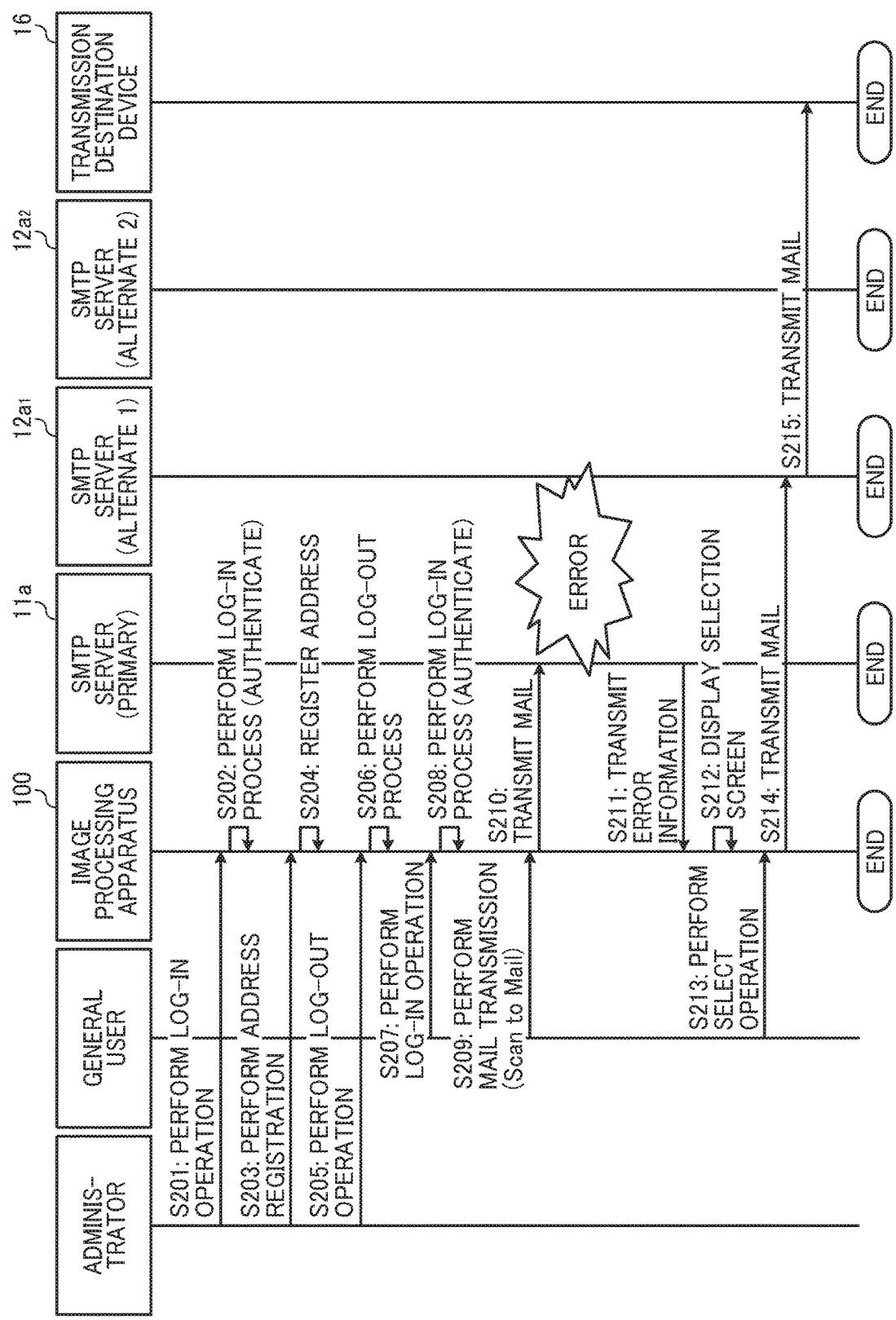
FIG. 8 is a sequence diagram illustrating an example of a process performed by the system according to the first embodiment of the disclosure.

A description is now given of an example of a process performed by the system 1 according to the first embodiment, with reference to FIG. 8.

FIG. 8 is a sequence diagram illustrating an example of the process performed by the system 1 according to the first embodiment. In the example of FIG. 8, the SMTP servers $12a_1$ (alternate 1) and the SMTP server $12a_2$ (alternate 2) are available alternate mail servers.

As illustrated in FIG. 8, the image processing apparatus 100 receives a login operation of the administrator (Step S201). The image processing apparatus 100, accordingly, performs login processing for the administrator (authentication of the administrator) (Step S202). In the example of FIG. 8, the authentication of the administrator is successful. The image processing apparatus 100 receives an address registration operation performed by the administrator (Step S203). The image processing apparatus 100, accordingly, registers the primary address information and the alternate address information in the storage unit 113 (Step S204). The image processing apparatus 100 receives a logout operation performed by the administrator (Step S205). The image processing apparatus 100, accordingly, performs logout processing for the administrator (Step S206).

The image processing apparatus 100 receives a login operation of a general user (Step S207). The image processing apparatus 100, accordingly performs login processing for the general user (authentication of the general user) (Step S208). In the example of FIG. 8, the authentication of the general user is successful. The image processing apparatus 100 receives a mail transmission operation performed by the general user (a mail transmission operation by executing the Scan to Mail function) (Step S209). The image processing apparatus 100, accordingly, transmits the e-mail by using the SMTP server 11a based on the primary address information stored in the storage unit 113, which is the primary mail server (Step S210).

At this time, it is assumed that the SMTP server 11a fails to transmit the e-mail, and a transmission error occurs. In response to the occurrence of the error, the SMTP server 11a transmits transmission error information to the image processing apparatus 100 (Step S211). The image processing apparatus 100, accordingly, displays the selection screen for selecting one of the alternate mail servers, based on the alternate address information stored in the storage unit 113 (Step S212). The selection screen also includes information indicating that the transmission of the e-mail by using the SMTP server 11a, which is the primary mail server, has failed.

The image processing apparatus 100 receives a selection operation performed on the selection screen by the general user (Step S213). Here in the example embodiment, it is assumed that the general user selects, on the selection screen, the SMTP server $12a_1$ from the SMTP server $12a_1$ and the SMTP server $12a_2$. The image processing apparatus 100, accordingly, transmits the e-mail by using the selected SMTP server $12a_1$ (Step S214). The SMTP server $12a_1$ transmits the e-mail to the transmission destination device 16 (Step S215).

As described above, the image processing apparatus 100 registers the primary address information and the alternate address information according to an operation performed by the administrator, and in a case where the transmission of the e-mail by using the primary mail server fails when a general user uses the image processing apparatus 100, the image processing apparatus displays a selection screen for selecting an alternate mail server based on the alternate address information and transmits the e-mail by using the alternate mail server selected on the selection screen. As a result, the image processing apparatus 100 according to the present embodiment can suppress the interference to the use's work while ensuring the security, even in a case of absence of the administrator. Examples of the case of the absence of the administrator include temporary absence due to any reason and absence due to taking holidays. In such a case, the above-described effect can be achieved by temporarily setting to use the alternate mail server.

Second Embodiment

A functional configuration of an image processing apparatus 200 according to a second embodiment is described below with reference to FIG. 9.

Figure 9:
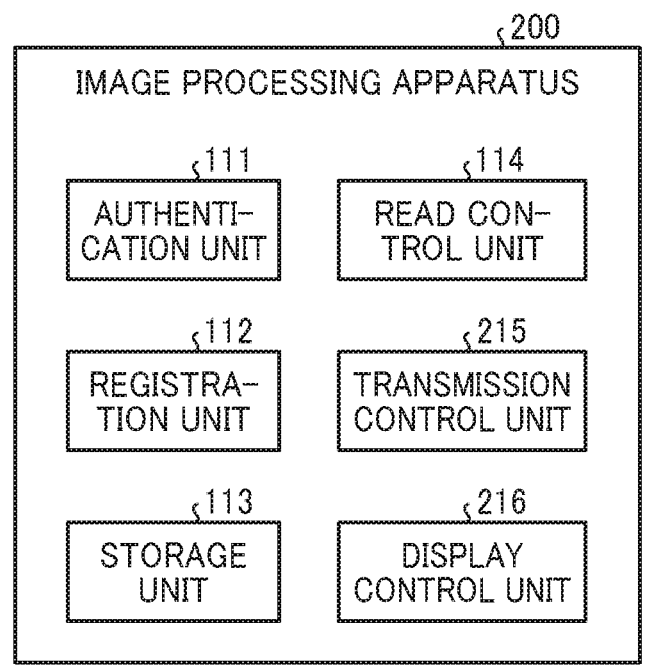
FIG. 9 is a block diagram illustrating an example of a functional configuration of an image processing apparatus according to a second embodiment of the disclosure.

FIG. 9 is a block diagram illustrating an example of the functional configuration of the image processing apparatus 200 according to the second embodiment. In the following description of the second embodiment, the same reference numerals are assigned to components having the same or like functions as the components of the image processing apparatus 100 according to the first embodiment, and the redundant descriptions thereof may be omitted. A system configuration of a system 2 according to the second embodiment is substantially the same as the system configuration of the system 1 according to the first embodiment, except for including the image processing apparatus 200 instead of the image processing apparatus 100. In addition, a hardware configuration of the image processing apparatus 200 according to the second embodiment is also substantially the same as the hardware configuration of the image processing apparatus 100 according to the first embodiment.

As illustrated in FIG. 9, the image processing apparatus 200 includes the authentication unit 111, the registration unit 112, the storage unit 113, the read control unit 114, a transmission control unit 215, and a display control unit 216. A part or all of the above-mentioned functional components other than the storage unit 113 may be implemented by a hardware circuit or software (a program) executed.

The display control unit 216 displays a selection screen for selecting an alternate mail server, when there is alternate address information indicating a plurality of addresses corresponding to a plurality of alternate mail servers More specifically, the display control unit 216 acquires the alternate address information stored in the storage unit 113 when the transmission control unit 215 fails to transmit an e-mail by using the primary mail server. Then, the display control unit 216 displays the selection screen for selecting one of the plurality of alternate mail servers (e.g., the SMTP servers 12a), when the acquired alternate address information indicates the plurality of addresses corresponding to the plurality of alternate mail servers. That is, the display control unit 216 does not display the selection screen for selecting an alternate mail server when there is alternate address information indicating a single address of a single alternate mail server so that a general user does not select any alternate mail server. In addition, when there is the alternate address information indicating the single address of the single alternate mail server, the display control unit 216 notifies the transmission control unit 215 of the alternate address information indicating the single address of the single alternate mail server.

When there is the alternate address information indicating the single address of the single alternate mail server, the transmission control unit 215 transmits the e-mail by using the alternate mail server corresponding to the alternate address information. More specifically, the transmission control unit 215 transmits the e-mail by using the alternate mail server (e.g., the SMTP server 12a) corresponding to the alternate address information, when receiving, from the display control unit 216, the notification of the alternate address information indicating the single address of the single alternate mail server. That is, when there is the alternate address information indicating the only one address, the transmission control unit 215 transmits the e-mail by using the alternate mail server, without causing the general user to select any alternate mail server. In addition, when there is the alternate address information indicating the plurality of addresses corresponding to the plurality of the alternate mail servers and one of the plurality of alternate mail servers is selected, the transmission control unit 215 transmits the e-mail by using the selected alternate mail server in the same way as the first embodiment.

Figure 10:
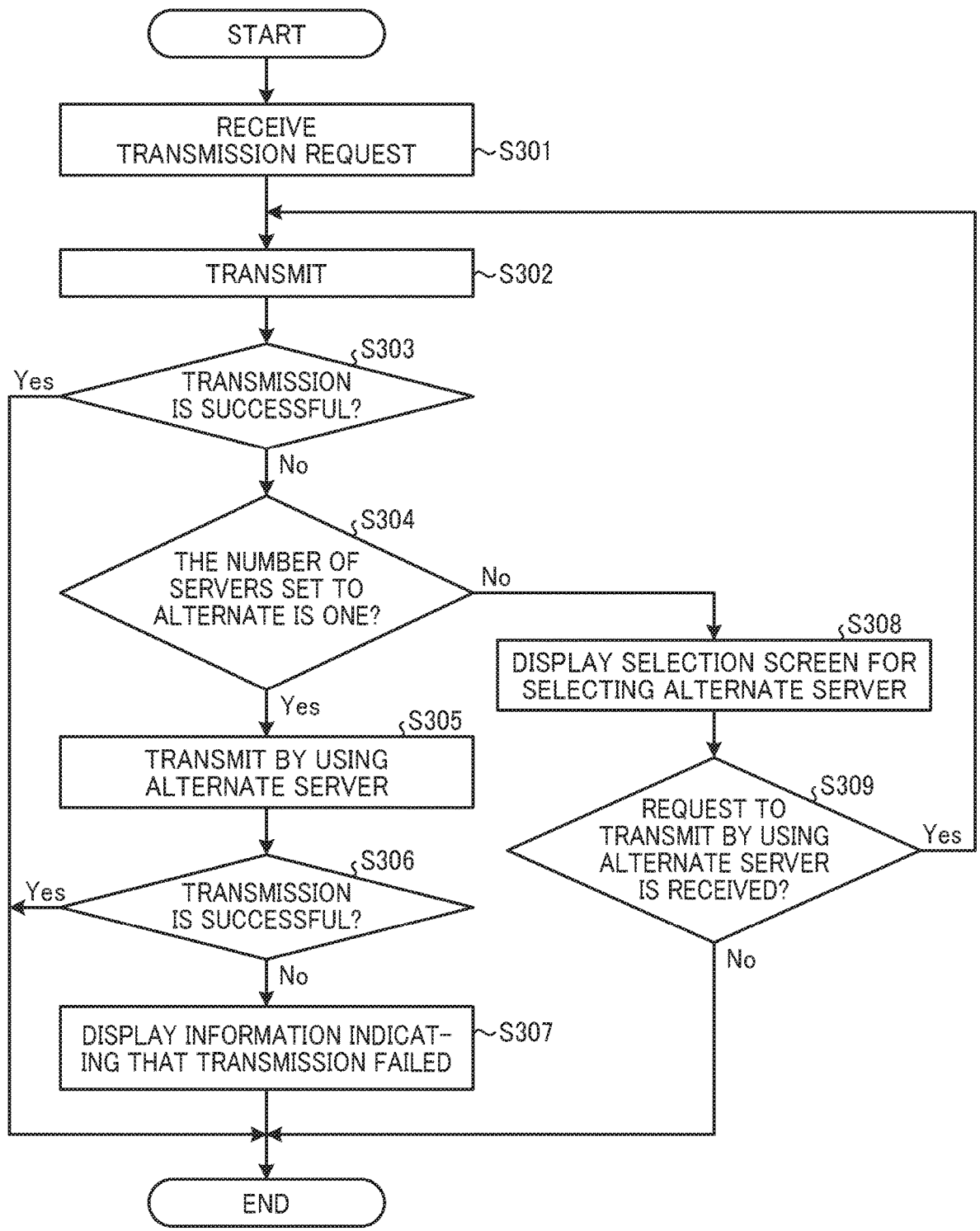
FIG. 10 is a flowchart illustrating an example of a process performed by the image processing apparatus according to the second embodiment of the disclosure.

A description is now given of a process performed by the image processing apparatus 200 according to the second embodiment, with reference to FIG. 10.

FIG. 10 is a flowchart illustrating an example of the process performed by the image processing apparatus 200 according to the second embodiment. In the example of FIG. 10, the primary address information and the alternate address information are set by the administrator in advance. In addition, in the example of FIG. 10, a general user performs a login operation and executes the Scan to Mail function after being successfully authenticated.

As illustrated in FIG. 10, the image processing apparatus 200 receives a transmission request (first transmission request) to transmit an e-mail by using the primary mail server, according to the execution of the Scan to Mail function (Step S301). Then, the image processing apparatus 200 transmits the e-mail by using the SMTP server 11a, which is the primary mail server, based on the primary address information stored in the storage unit 113 (Step S302). When the transmission of the e-mail by using the SMTP server 11a is successful (Step S303: Yes), the process performed by the image processing apparatus 200 ends.

On the other hand, when the transmission of the e-mail by using the SMTP server 11a fails (Step S303: No), the image processing apparatus 200 acquires the alternate address information stored in the storage unit 113. When there is the alternate address information indicating the only one alternate mail address, namely the number of servers set to alternate mail servers is one (Step S304: Yes), the image processing apparatus 200 transmits the e-mail by using the alternate mail server (e.g., SMTP server $12a_1$) (Step S305). When the transmission of the e-mail by using the SMTP server $12a_1$ is successful (Step S306: Yes), the process performed by the image processing apparatus 200 ends. On the other hand, when the transmission of the e-mail by using the SMTP server $12a_1$ fails (Step S306: No), the image processing apparatus 200 displays information indicating the transmission has failed because there are not any other alternate mail servers available, and the process ends (Step S307).

In addition, when the acquired alternate address information indicates a plurality of addresses of a plurality of alternate mail servers (Step S304: No), the image processing apparatus 200 displays the selection screen for selecting one of the plurality of alternate mail servers (Step S308). Subsequently, when receiving a transmission request (second transmission request) to transmit the e-mail by using the SMTP server 12a, which is one of the plurality of alternate mail servers, selected on the selection screen according to an operation performed on the selection screen (Step S309: Yes), the image processing apparatus 200 transmits the e-mail by using the selected SMTP server 12a (Step S302). On the other hand, when a request to cancel the transmission is received according to an operation performed on the selection screen (Step S309: No), the process performed by the image processing apparatus 200 ends.

Figure 11:
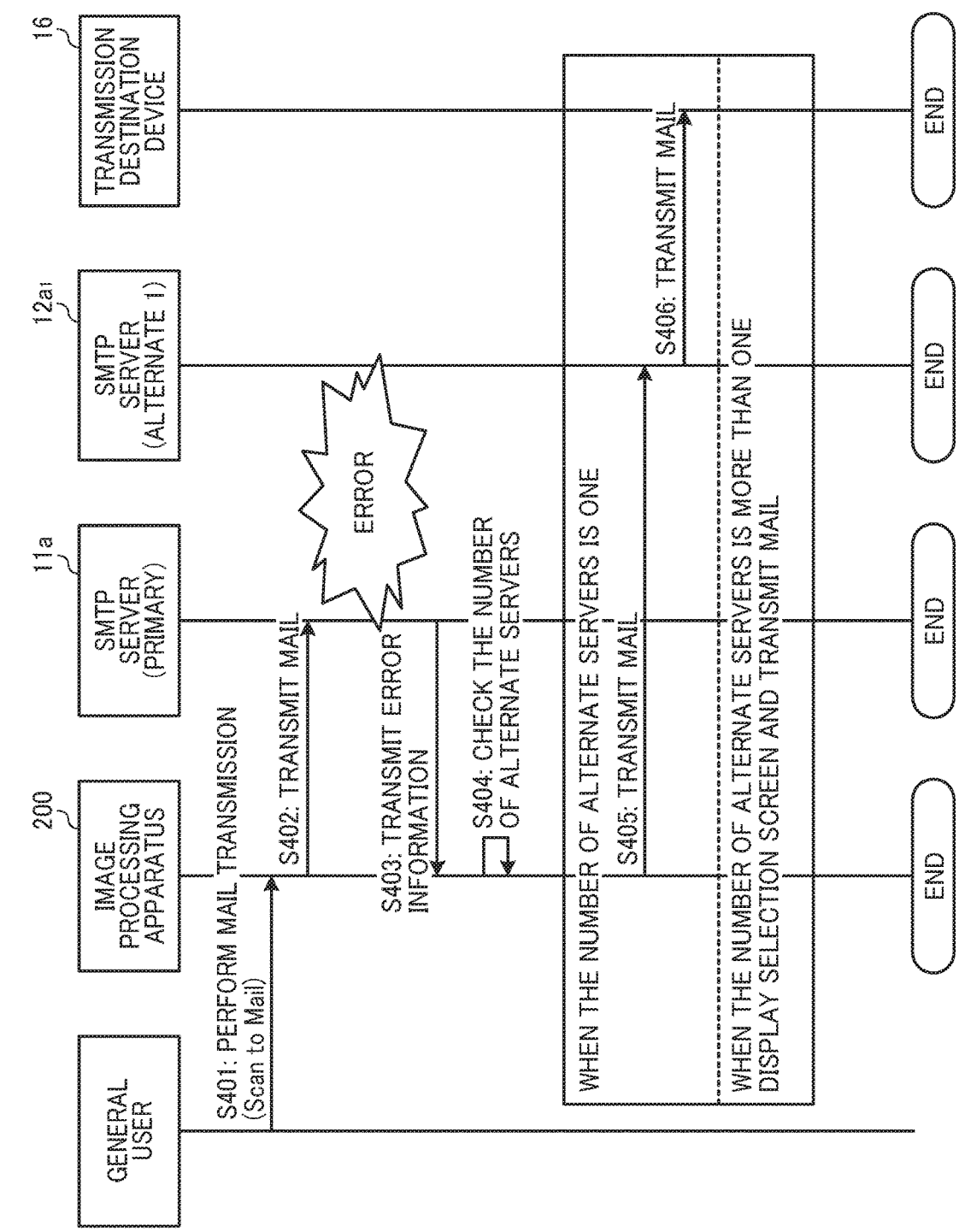
FIG. 11 is a sequence diagram illustrating an example of a process performed by a system according to the second embodiment of the disclosure.

A description is now given of an example of a process performed by the system 2 according to the second embodiment, with reference to FIG. 11.

FIG. 11 is a sequence diagram illustrating an example of the process performed by the system 2 according to the second embodiment. In the example of FIG. 11, the SMTP servers $12a_1$ (alternate 1) is used as an available alternate mail server. In addition, the processing of Step S201 to Step S208 illustrated in FIG. 8 is performed before Step S401 in the process illustrated in FIG. 11.

As illustrated in FIG. 11, the image processing apparatus 200 receives a mail transmission operation performed by the general user (a mail transmission operation by executing the Scan to Mail function) (Step S401). Upon receiving the mail transmission operation, the image processing apparatus 200 transmits the e-mail by using the SMTP server 11a, which is the primary mail server, based on the primary address information stored in the storage unit 113 (Step S402). At this time, it is assumed that the SMTP server 11a fails to transmit the e-mail, and a transmission error occurs. In response to the transmission error, the SMTP server 11a transmits transmission error information to the image processing apparatus 200 (Step S403).

Upon receiving the transmission error information, the image processing apparatus 200 acquires the alternate address information stored in the storage unit 113 and checks the number of alternate mail servers (Step S404).

When the alternate address information indicates the only one address of a single alternate mail server (e.g., the SMTP server $12a_1$), namely, the number of the alternate mail servers set is one, the image processing apparatus 200 transmits the e-mail by using the SMTP server $12a_1$ (Step S405). The SMTP server $12a_1$ transmits the e-mail to the transmission destination device 16 (Step S406). On the other hand, if the alternate address information indicates a plurality of addresses, the image processing apparatus 200 displays the selection screen and transmits the e-mail by using an alternate mail server selected on the selection screen in the same way as the processing of S212 and the subsequent steps illustrated in FIG. 8.

As described above, when the single alternate mail server is set, the image processing apparatus 200 transmits the e-mail by using the alternate mail server without displaying the selection screen, namely, the image processing apparatus 200 controls display of the selection screen not to be displayed. Accordingly, the image processing apparatus 200 according to the second embodiment can omit the step of selecting an alternate mail server to be performed by the general user, resulting in enhancement in the work efficiency.

Third Embodiment

A functional configuration of an image processing apparatus 300 according to a third embodiment is described below with reference to FIG. 12.

Figure 12:
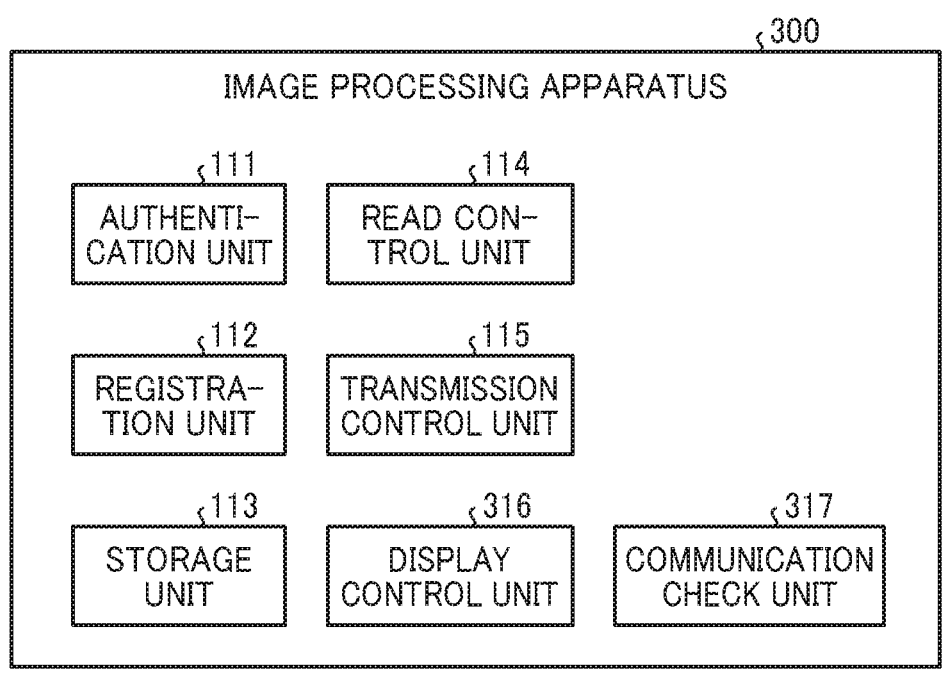
FIG. 12 is a block diagram illustrating an example of a functional configuration of an image processing apparatus according to a third embodiment of the disclosure.

FIG. 12 is a block diagram illustrating an example of the functional configuration of the image processing apparatus 300 according to the third embodiment. In the following description of the third embodiment, the same reference numerals are assigned to components having the same or like functions as the components of the image processing apparatus 100 according to the first embodiment, and the redundant descriptions thereof may be omitted. A system configuration of a system 3 according to the third embodiment is substantially the same as the system configuration of the system 1 according to the first embodiment, except for including the image processing apparatus 300 instead of the image processing apparatus 100. In addition, a hardware configuration of the image processing apparatus 300 according to the third embodiment is substantially the same as the hardware configuration of the image processing apparatus 100 according to the first embodiment.

As illustrated in FIG. 12, the image processing apparatus 300 includes the authentication unit 111, the registration unit 112, the storage unit 113, the read control unit 114, the transmission control unit 115, a display control unit 316, and a communication check unit 317. A part or all of the above-mentioned functional components other than the storage unit 113 may be implemented by a hardware circuit or software (a program) executed.

The display control unit 316 acquires the alternate address information stored in the storage unit 113 when the transmission control unit 115 fails to transmit an e-mail by using the primary mail server. Then, the display control unit 316 notifies the communication check unit 317 of the acquired alternate address information. The display control unit 316 also requests the communication check unit 317 to check whether the communication with each alternate mail server is available or not. Alternatively, the display control unit 316 may transmit, to the communication check unit 317, a request to check whether the communication with each alternate mail server is available or not, without notifying the communication check unit 317 of the alternate address information, because the alternate address information can be acquired from the storage unit 113.

The communication check unit 317 checks communication with each alternate mail server. More specifically, the communication check unit 317 checks communication with each of all the alternate mail servers (e.g., SMTP servers $12a$) corresponding to the alternate address information in response to the request from the display control unit 316. For example, the communication checks may be performed by packet internet groper (PING). The communication check unit 317, then, notifies the display control unit 316 of a result of the communication checks. Hereinafter, the result of the communication checks is also referred to as a determination result. For example, the determination result may be alternate address information indicating one or more addresses of corresponding one or more alternate mail servers that are determined, by the communication checks, to be available to transmit an e-mail.

In response to the determination result, namely, the result of the communication checks, the display control unit 316 displays the selection screen for selecting one of the one or more alternate mail servers based on the alternate address information indicating the one or more addresses of the corresponding one or more alternate mail servers that are determined to be available to transmit the e-mail. More specifically, upon receiving the determination result from the communication check unit 317, the display control unit 316 displays the selection screen for selecting one of the one or more alternate mail servers based on the alternate address information indicating the one or more addresses of the one or more corresponding alternate mail servers that are determined, by the communication checks, to be available to transmit the e-mail. In addition, the selection screen also includes information indicating that the transmission of the e-mail by using the primary mail server has failed.

Figure 13:
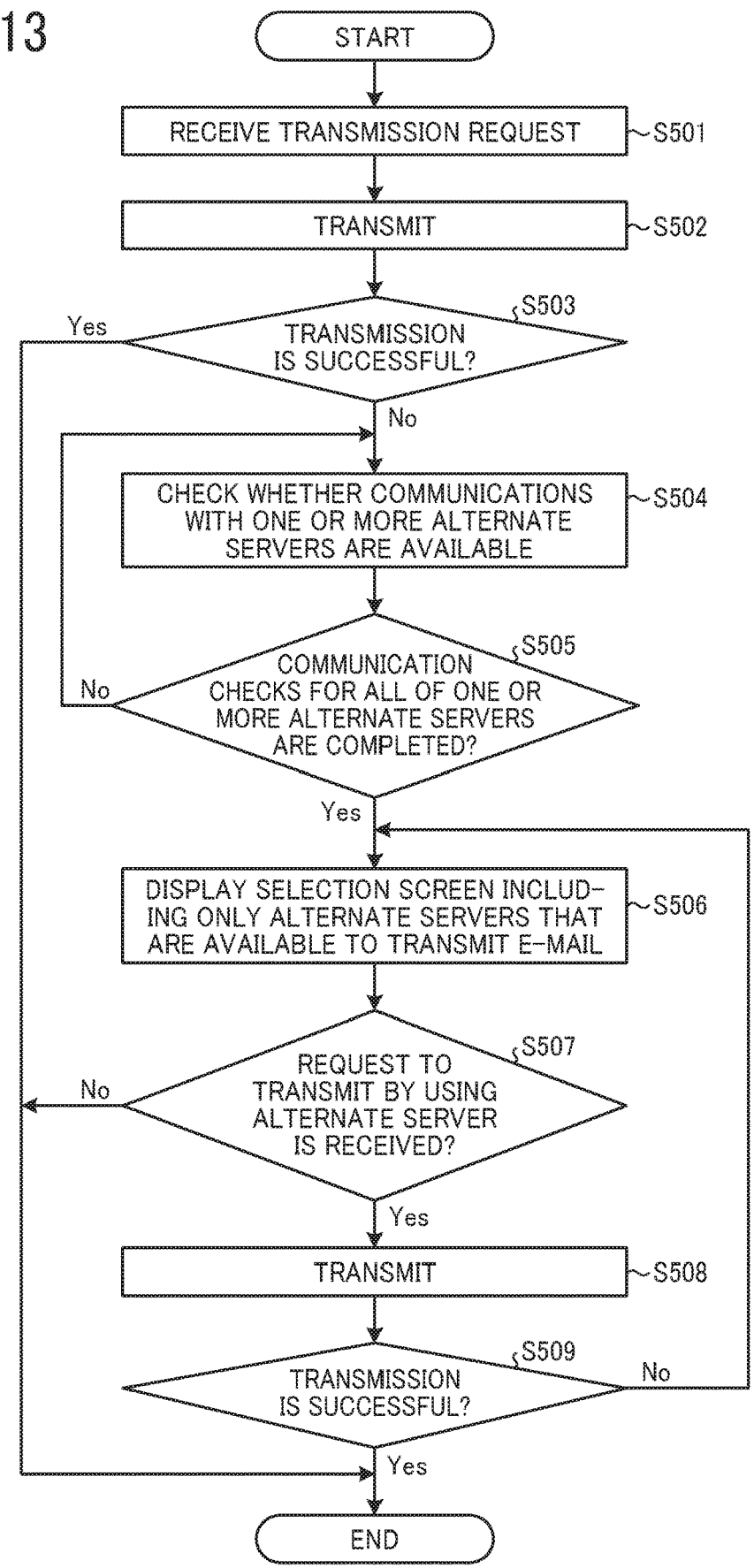
FIG. 13 is a flowchart illustrating an example of a process performed by the image processing apparatus according to the third embodiment of the disclosure.

A description is now given of a process performed by the image processing apparatus 300 according to the third embodiment, with reference to FIG. 13.

FIG. 13 is a flowchart illustrating an example of the process performed by the image processing apparatus 300 according to the third embodiment. In the example of FIG. 13, the primary address information and the alternate address information are set by the administrator in advance. In addition, in the example of FIG. 13, a general user performs a login operation and executes the Scan to Mail function after being successfully authenticated.

As illustrated in FIG. 13, the image processing apparatus 300 receives a transmission request (first transmission request) to transmit an e-mail by using the primary mail server according to the execution of the Scan to Mail function (Step S501). Then, the image processing apparatus 300 transmits the e-mail by using the SMTP server $11a$, which is the primary mail server, based on the primary address information stored in the storage unit 113 (Step S502). When the transmission of the e-mail by using the SMTP server $11a$ is successful (Step S503: Yes), the process performed by the image processing apparatus 300 ends.

On the other hand, when the transmission of the e-mail by using the SMTP server $11a$ fails (Step S503: No), the image processing apparatus 300 checks whether communication with each alternate mail server is available or not based on the alternate address information stored in the storage unit 113 (Step S504). When there are one or more alternate mail servers for which the image processing apparatus 300 has not yet performed the communication checks based on the alternate address information, (Step S505: No), the image processing apparatus 300 performs the communication checks until the communication checks for all of the alternate mail servers are performed (Step S504). After performing the communication checks for all of the alternate mail servers (Step S505: Yes), the image processing apparatus 300 displays the selection screen including one or more alternate mail servers that are available to transmit the e-mail (Step S506). The selection screen also includes information indicating that the transmission of the e-mail by using the SMTP server 11a has failed.

Subsequently, when receiving a transmission request (second transmission request) to transmit the e-mail by using the SMTP server 12a, which is an alternate mail server, according to an operation performed on the selection screen (Step S507: Yes), the image processing apparatus 300 transmits the e-mail by using the selected SMTP server 12a (Step S508). On the other hand, when a request to cancel the transmission is received according to an operation performed on the selection screen (Step S507: No), the process performed by the image processing apparatus 300 ends. In addition, the process performed by the image processing apparatus 300 ends when the transmission of the e-mail by using the SMTP server 12a is successful (Step S509: Yes). On the other hand, the image processing apparatus 300 performs the processing of S506 again when the transmission of the e-mail by using the SMTP server 12a fails (Step S509: No).

Figure 14:
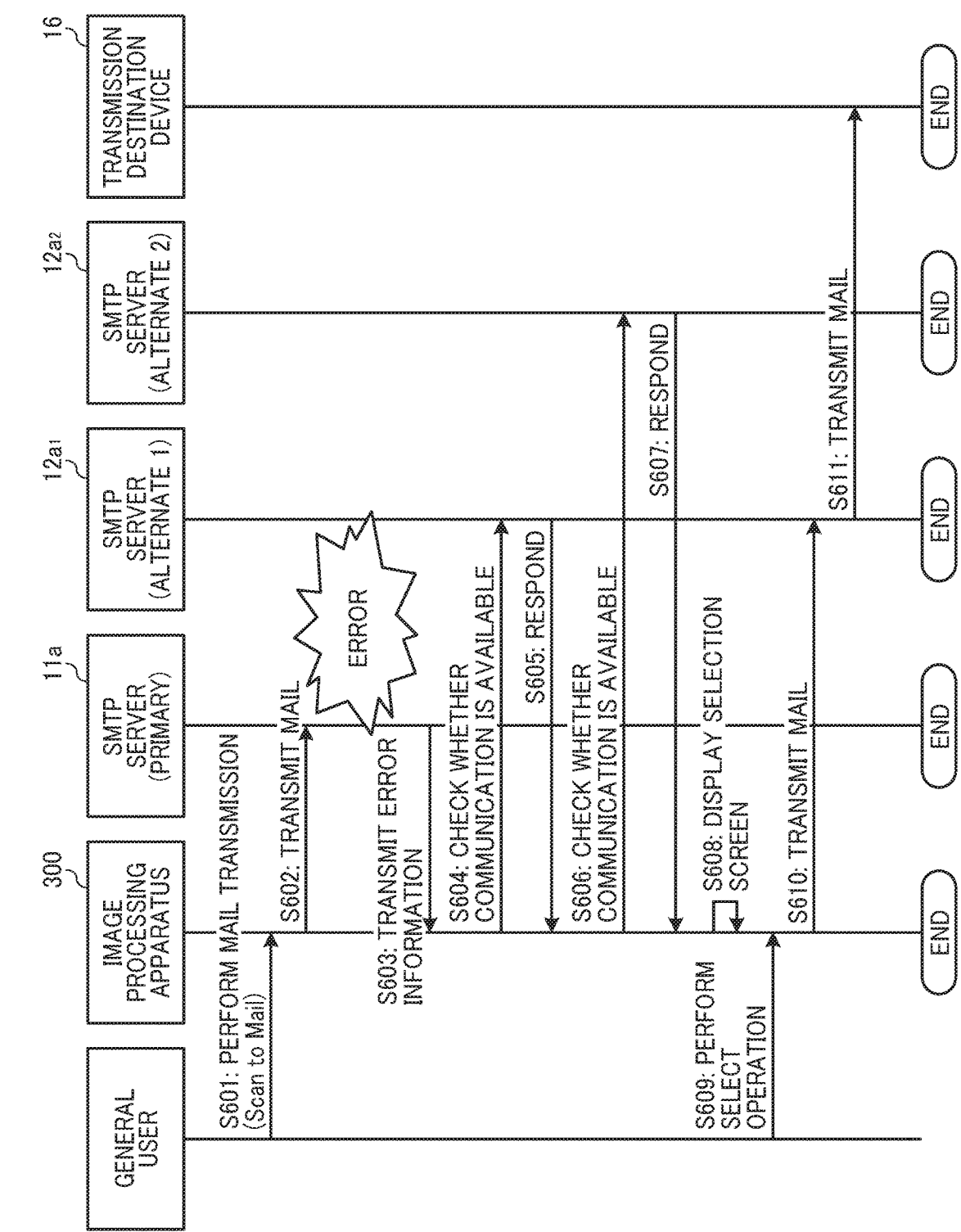
FIG. 14 is a sequence diagram illustrating an example of a process performed by a system according to the third embodiment of the disclosure.

A description is now given of an example of a process performed by the system 3 according to the third embodiment, with reference to FIG. 14.

FIG. 14 is a sequence diagram illustrating an example of the process performed by the system 3 according to the third embodiment. In the example of FIG. 14, the SMTP servers $12a_1$ (alternate 1) and SMTP server $12a_2$ (alternate 2) are set to alternate mail servers. In addition, it is assumed that the processing of Step S201 to Step S208 illustrated in FIG. 8 is performed before Step S601 in the process illustrated in FIG. 14.

As illustrated in FIG. 14, the image processing apparatus 300 receives a mail transmission operation performed by the general user (a mail transmission operation by executing the Scan to Mail function) (Step S601). Upon receiving the mail transmission operation, the image processing apparatus 300 transmits an e-mail by using the SMTP server 11a, which is the primary mail server, based on the primary address information stored in the storage unit 113 (Step S602). In the example of FIG. 14, the SMTP server 11a fails to transmit the e-mail, and a transmission error occurs. In response to the transmission error, the SMTP server 11a transmits transmission error information to the image processing apparatus 300 (Step S603).

Upon receiving the transmission error information, the image processing apparatus 300 acquires the alternate address information stored in the storage unit 113 and checks whether the communication with the SMTP server $12a_1$, which is one of the alternate mail servers corresponding to the alternate address information, is available or not (Step S604). The SMTP server $12a_1$ communicates with the image processing apparatus 300 in response to the communication check (Step S605). In addition, the image processing apparatus 300 checks whether the communication with the SMTP server $12a_2$, which is another one of the alternate mail servers corresponding to the alternate address information, is available or not (Step S606). The SMTP server $12a_2$ communicates with the image processing apparatus 300 in response to the communication check (Step S607).

Upon completion of the communication checks for all of the alternate mail servers corresponding to the alternate address information, the image processing apparatus 300 displays the selection screen including one or more alternate mail servers that are available to transmit the e-mails (Step S608). The selection screen also includes information indicating that the transmission of the e-mail by using the SMTP server 11a, which is the primary mail server, has failed.

The image processing apparatus 300 receives a selection operation performed on the selection screen by the general user (Step S609). In the example of FIG. 14, the general user selects the SMTP server $12a_1$ on the selection screen. The image processing apparatus 300, accordingly, transmits the e-mail by using the selected SMTP server $112a_1$ (Step S610). The SMTP server $12a_1$ transmits the e-mail to the transmission destination device 16 (Step S611).

As described above, the image processing apparatus 300 performs the communication checks for all of the alternate mail servers and displays the selection screen including the only one or more alternate mail servers that are available to transmit the e-mail. As a result, the image processing apparatus 300 according to the third embodiment can decrease an occurrence rate of transmission error in using the alternate mail server, resulting in enhancement in the work efficiency.

Fourth Embodiment

A functional configuration of an image processing apparatus 400 according to a fourth embodiment is described below with reference to FIG. 15.

Figures 15, 16:
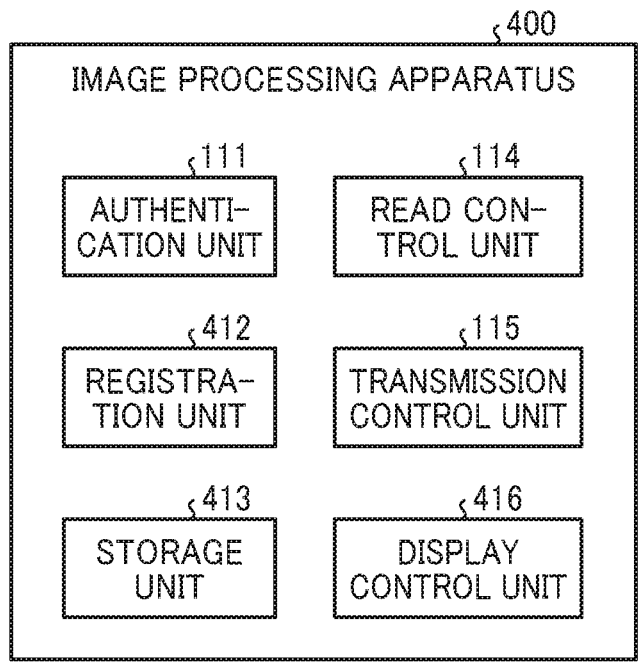
FIG. 15 is a block diagram illustrating an example of a functional configuration of an image processing apparatus according to a fourth embodiment of the disclosure.
FIG. 16 is a conceptual diagram illustrating an example of authority information stored in a storage unit according to the fourth embodiment of the disclosure.

FIG. 15 is a block diagram illustrating an example of the functional configuration of the image processing apparatus 400 according to the fourth embodiment. In the following description of the fourth embodiment, the same reference numerals are assigned to components having the same or like functions as the components of the image processing apparatus 100 according to the first embodiment, and the redundant descriptions thereof may be omitted. A system configuration of a system 4 according to the fourth embodiment is substantially the same as the system configuration of the system 1 according to the first embodiment, except for including the image processing apparatus 400 instead of the image processing apparatus 100. In addition, a hardware configuration of the image processing apparatus 400 according to the fourth embodiment is substantially the same as the hardware configuration of the image processing apparatus 100 according to the first embodiment.

As illustrated in FIG. 15, the image processing apparatus 400 includes the authentication unit 111, a registration unit 412, a storage unit 413, the read control unit 114, the transmission control unit 115, and a display control unit 416. A part or all of the above-mentioned functional components other than the storage unit 413 may be implemented by a hardware circuit or software (a program) executed.

The registration unit 412 registers, in the storage unit 413, authority information indicating whether each user is authorized to use one or more alternate mail servers. More specifically, the registration unit 412 registers, in the storage unit 413, an authority information record for each of the general users, according to an operation performed using the operation display device 106 by the administrator. Each authority information record indicates whether the corresponding user is authorized to use the one or more alternate mail servers or not. Hereinafter, the operation to register the authority information performed by the administrator is also referred to as an authority registration operation. For example, the authority information for each user is registered in association with an address book of each user. In the example of the present embodiment, the administrator logs in, in advance. After the authentication unit 111 successfully authenticates the administrator, the registration unit 412 registers the authority information in the storage unit 413 according to the authority registration operation performed on the operation display device 106.

FIG. 16 is a conceptual diagram illustrating an example of the authority information stored in the storage unit 413 according to the fourth embodiment. As illustrated in FIG. 16, in each authority information record of the authority information stored in the storage unit 413, information indicating whether a corresponding general user is authorized to use the one or more alternate mail servers or not (alternate server usage authority) is associated with an address book of the corresponding general user. In the example illustrated in FIG. 16, a user A, a user B, and a user C are authorized to use the one or more alternate mail servers.

According to the authority information, the display control unit 416 controls display of a selection screen for selecting one of the one or more alternate mail servers. More specifically, the display control unit 416 acquires the authority information stored in the storage unit 413, when the transmission control unit 115 fails to transmit an e-mail by using the primary mail server. Here, the acquired authority information is the authority information record corresponding to an address book of a current general user who has logged in. The display control unit 416 checks whether the current general user is authorized to use the one or more alternate mail servers or not.

When the general user is not authorized to use the one or more alternate mail servers, the display control unit 416 displays information indicating that the transmission of the e-mail by using the primary mail server has failed, without displaying the selection screen. On the other hand, when the general user is authorized to use the one or more alternate mail servers, the display control unit 416 acquires the alternate address information stored in the storage unit 413. Then, the display control unit 416 displays the selection screen for selecting one of the one or more alternate mail servers based on the acquired alternate address information.

Figure 17:
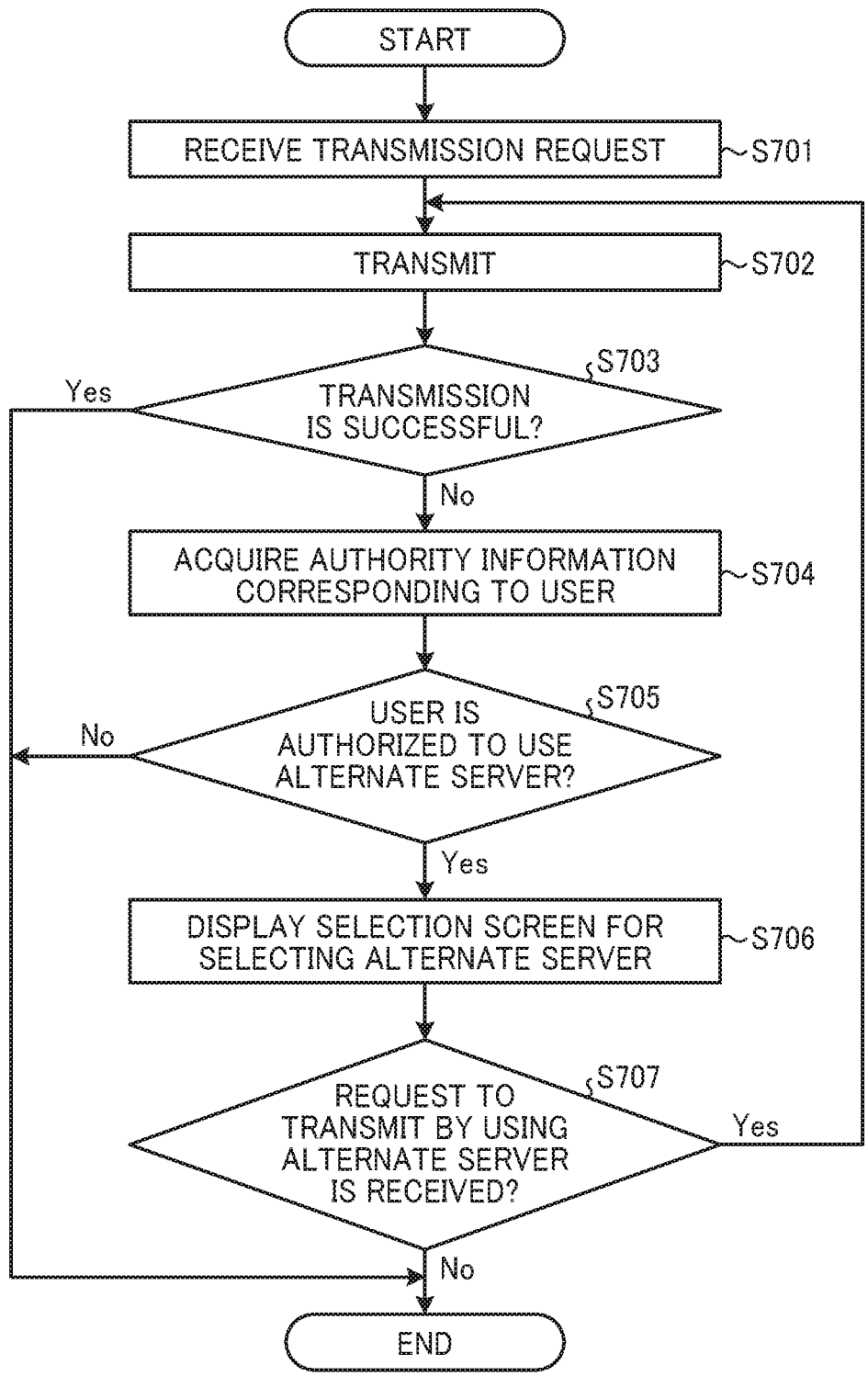
FIG. 17 is a flowchart illustrating an example of a process performed by the image processing apparatus according to the fourth embodiment of the disclosure.

A description is now given of a process performed by the image processing apparatus 400 according to the fourth embodiment, with reference to FIG. 17.

FIG. 17 is a flowchart illustrating an example of the process performed by the image processing apparatus 400 according to the fourth embodiment. In the example of FIG. 17, the primary address information and the alternate address information are set by the administrator in advance. In addition, in the example of FIG. 17, the general user performs a login operation and executes the Scan to Mail function after being successfully authenticated.

As illustrated in FIG. 17, the image processing apparatus 400 receives a transmission request (first transmission request) to transmit an e-mail by using the primary mail server according to the execution of the Scan to Mail function (Step S701). Then, the image processing apparatus 400 transmits the e-mail by using the SMTP server 11*a*, which is the primary mail server, based on the primary address information stored in the storage unit 413 (Step S702). When the transmission of the e-mail by using the SMTP server 11*a* is successful (Step S703: Yes), the process performed by the image processing apparatus 400 ends.

On the other hand, when the transmission of the e-mail by using the SMTP server 11*a* fails (Step S703: No), the image processing apparatus 400 acquires, from the storage unit 413, the authority information corresponding to the current general user who has logged in (Step S704). Then, based on the acquired authority information, the image processing apparatus 400 determines whether the current general user who has logged in is authorized to use the one or more alternate mail servers or not (Step S705). When the current general user who has logged in is not authorized to use the one or more alternate mail servers (Step S705: No), the image processing apparatus 400 displays information indicating that the transmission of the e-mail by using the SMTP server 11*a* has failed, and the process ends.

On the other hand, when the current general user who has logged in is authorized to use the one or more alternate mail servers (Step S705: Yes), the image processing apparatus 400 displays the selection screen for selecting one of the one or more alternate mail servers, based on the alternate address information stored in the storage unit 413 (Step S706). The selection screen also includes information indicating that the transmission of the e-mail by using the SMTP server 11*a* has failed. Then, when receiving a transmission request (second transmission request) to transmit the e-mail by using the SMTP server 12*a*, which is one of the one or more alternate mail servers, according to an operation performed on the selection screen (Step S707: Yes), the image processing apparatus 400 transmits the e-mail by using the selected SMTP server 12*a* (Step S702). On the other hand, when a request to cancel the transmission is received according to an operation performed on the selection screen (Step S707: No), the process performed by the image processing apparatus 400 ends.

Figure 18B:
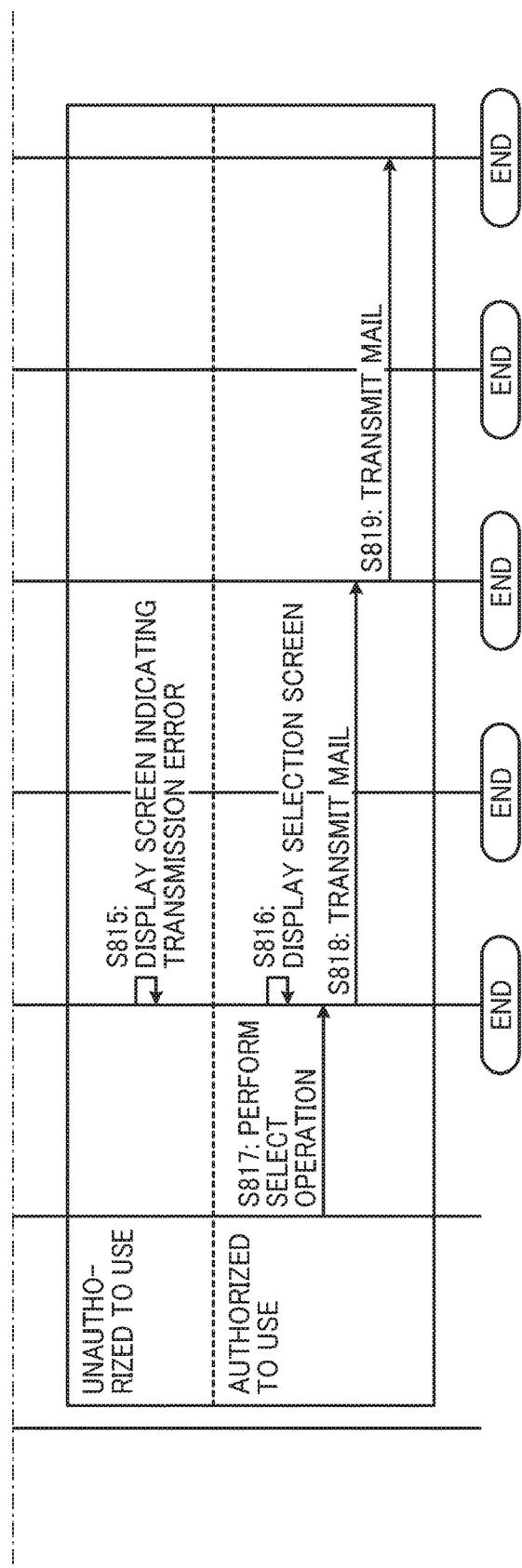

A description is now given of an example of a process performed by the system 4 according to the fourth embodiment, with reference to FIG. 18A and FIG. 18B.

FIG. 18A and FIG. 18B are a sequence diagram illustrating an example of the process performed by the system 4 according to the fourth embodiment. In the example of FIG. 18A and FIG. 18B, the SMTP servers $12a_1$ (alternate 1) and SMTP server $12a_2$ (alternate 2) are set to the alternate mail servers.

As illustrated in FIG. 18A and FIG. 18B, the image processing apparatus 400 receives a login operation performed by the administrator (Step S801). The image processing apparatus 400, accordingly, performs login processing for the administrator (authentication of the administrator) (Step S802). In the example of FIG. 18A and FIG. 18B, the administrator is successfully authenticated in S802. The image processing apparatus 400 receives an address registration operation performed by the administrator (Step S803). The image processing apparatus 400, accordingly, registers the primary address information and the alternate address information in the storage unit 413 (Step S804). The image processing apparatus 400 receives an authority registration operation performed by the administrator (Step S805). Upon receiving the authority registration operation, the image processing apparatus 400 registers, in the storage unit 413, authority information indicating whether each user is authorized to use the alternate mail servers or not (Step S806). The image processing apparatus 400 receives a logout operation performed by the administrator (Step S807). The image processing apparatus 400, accordingly, performs logout processing for the administrator (Step S808).

The image processing apparatus 400 receives a login operation performed by a general user (Step S809). The image processing apparatus 400, accordingly, performs login processing for the general user (authentication of the general user) (Step S810). In the example of FIG. 18A and FIG. 18B, the general user is successfully authenticated in S810. The image processing apparatus 400 receives a mail transmission operation performed by general user (a mail transmission operation by executing the Scan to Mail function) (Step S811). Upon receiving the mail transmission operation, the image processing apparatus 400 transmits an e-mail by using the SMTP server 11a, which is the primary mail server, based on the primary address information stored in the storage unit 413 (Step S812).

At this time, it is assumed that the SMTP server 11a fails to transmit the e-mail, and a transmission error occurs. In response to the transmission error, the SMTP server 11a transmits transmission error information to the image processing apparatus 400 (Step S813). Then, the image processing apparatus 400 acquires, from the storage unit 413, the authority information corresponding to the current general user who has logged in and determines whether the general user is authorized to use the alternate mail servers or not (Step S814).

When the current general user who has logged in is not authorized to use the alternate mail servers, the image processing apparatus 400 displays information indicating that the transmission of the e-mail by using the SMTP server 11a has failed, and the process ends (Step S815). On the other hand, when the current general user who has logged in is authorized to use the alternate mail servers, the image processing apparatus 400 displays the selection screen for selecting one of the alternate mail servers, based on the alternate address information stored in the storage unit 413 (Step S816). The selection screen also includes information indicating that the transmission of the e-mail by using the SMTP server, which is the primary mail server, has failed.

The image processing apparatus 400 receives a selection operation performed on the selection screen by the general user (Step S817). In the example of FIG. 18A and FIG. 18B, the general user selects the SMTP server $12a_1$ on the selection screen, for example. The image processing apparatus 400, accordingly, transmits the e-mail by using the selected SMTP server $12a_1$ (Step S818). The SMTP server $12a_1$ transmits the e-mail to the transmission destination device 16 (Step S819).

As described above, the image processing apparatus 400 according to the fourth embodiment registers the authority information indicating whether each user is authorized to use the one or more alternate mail servers or not and allows the general user who is authorized to use the one or more alternate mail servers to transmit an e-mail by using an alternate mail server selected form the one or more alternate mail servers on the selection screen. According to the present embodiment, the image processing apparatus 400 ensures the security by giving authority to use the one or more alternate mail servers to selected ones of the general users.

Fifth Embodiment

In the above description, each of the image processing apparatuses 100, 200, 300, and 400 according to each of the first embodiment, the second embodiment, the third embodiment, and the fourth embodiment of the disclosure is described, however is not intended to be limiting of the present disclosure. In the following description, (1) log recording, (2) a configuration, and (3) a program are given, as examples of other embodiments.

(1) Log Recording

Figure 19:
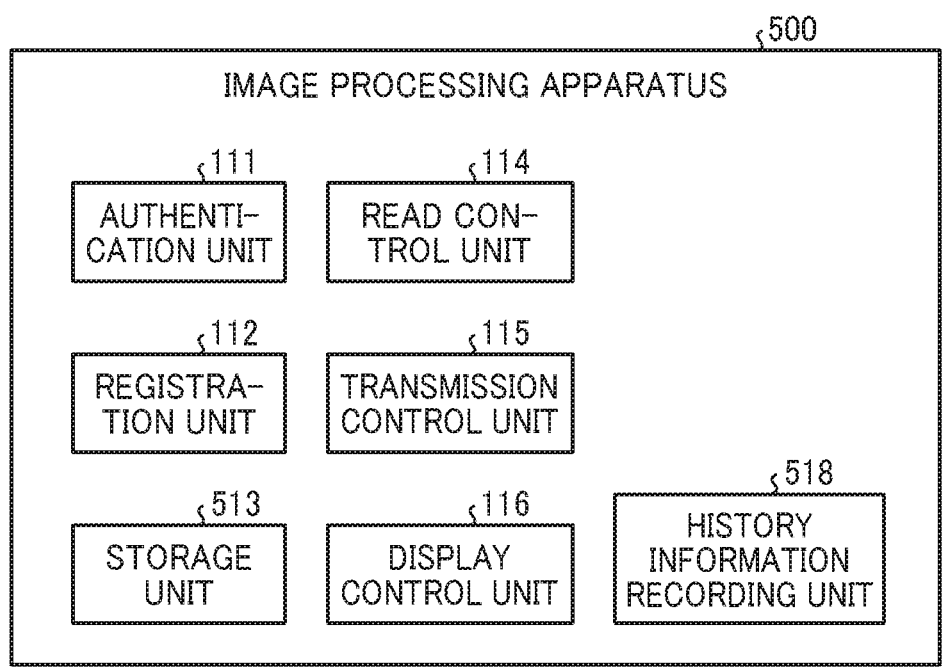
FIG. 19 is a block diagram illustrating an example of a functional configuration of an image processing apparatus according to a fifth embodiment of the disclosure.

FIG. 19 is a block diagram illustrating an example of a functional configuration of an image processing apparatus 500 according to a fifth embodiment. In the following description of FIG. 19, the same reference numerals are assigned to components having the same or like functions as the components of the image processing apparatus 100 according to the first embodiment, and the redundant descriptions thereof may be omitted.

As illustrated in FIG. 19, the image processing apparatus 500 includes the authentication unit 111, the registration unit 112, a storage unit 513, the read control unit 114, the transmission control unit 115, the display control unit 116, and a history information recording unit 518. A part or all of the above-mentioned functional components other than the storage unit 513 may be implemented by a hardware circuit or software (a program) executed.

The history information recording unit 518 records history information indicating a usage history of an alternate mail server in the storage unit 513. More specifically, when the transmission of an e-mail by using the alternate mail server is performed by the transmission control unit 115, the history information recording unit 518 records history information, as a log, in the storage unit 513. The history information stored as a log include, for example, information on a date and time indicating when the alternate mail server is used, an address of the used alternate mail server, and whether the transmission is successful or not.

FIG. 20 is a conceptual diagram illustrating an example of the history information stored in the storage unit 513 according to the fifth embodiment. As illustrated in FIG. 20, the storage unit 513 stores the history information as logs each of which includes information on a date and time indicating when a corresponding alternate mail server is used, an address (IP address information) of the corresponding alternate mail server, a transmission result, and other remarks. For example, as the transmission result, "SUCCESSFUL" or "FAILED" is stored. In the example of FIG. 20, "SUCCESSFUL" indicates that the transmission of an e-mail by using an alternate mail server is successful. On the other hand, "FAILED" indicates that the transmission of an e-mail by using an alternate mail server failed. In the remarks, information indicating a reason of the transmission error, such as "failed to connect to the server" etc. is stored when the transmission of an e-mail by using an alternate mail server failed, for example.

As described above, the image processing apparatus 500 records the history information indicating a usage history of the alternate mail server as a log. According to the present embodiment, the administrator can check the history information, and easily grasp the usage frequency, operation statuses of the alternate mail servers, for example.

(2) Configuration

The Operations, the controlling operations, the specific names, and the information including the various data and the parameters described above and illustrated in a figure may be modified arbitrarily unless otherwise noted. In addition, the components included in the devices illustrated in the figures are functional concepts, and such components are not required to be constructed physically as illustrated in the figures. That is, a specific embodiment of a device, in which components are separated from each other or combined together, is not limited to the illustration disclosed. Some of or all of the components may be physically separated from each other or combined together as desired according to various loads or usage conditions.

In above-described embodiments, the image processing apparatus 100 includes the CPU 102 that controls the overall operation of the image processing apparatus (See FIG. 2). However, the embodiments of the disclosure are not limited to this, and an image processing apparatus according to some embodiments may be provided with a main device and an operation device.

The main device includes a CPU, a ROM, a RAM, an HDD, a communication I/F, a connection I/F, and an engine device, which are connected to each other through a system bus. The CPU controls the overall operation of the main device. For example, the CPU controls the main device by executing a program stored in the ROM or the HDD, etc., using the RAM as a work area, to implement the various functions such as a copy function, a scan function, a facsimile communication function and a print function. The communication I/F is an interface for connecting the main device to a network. The connection I/F is an interface to communicate with the operation device through a communication path, for example. The engine device is a hardware component for performing general-purpose information processing and processing other than communication for implementing the above-described various functions.

The operation device includes a CPU, a ROM, a RAM, a flash memory, a communication I/F, a connection I/F, and an operation panel, which are connected to each other through a system bus. The CPU controls the overall operation of the operation device. The CPU controls the overall operation of the operation device by executing a program stored in the ROM or the flash memory, etc., using the RAM as a work area, to display information, such as an image, input and received according to a user operation. The communication I/F is an interface for connecting the operation device to a network. The connection I/F is an interface to communicate with the main device through a communication path, for example. The operation panel receives various inputs according to a user operation and displays various types of information.

That is, the image processing apparatus may include the main device and the operation device each of which may individually have the corresponding CPU. The main device includes, for example, a transmission unit that connects to a network to transmit an e-mail and an image forming unit that is corresponding to the engine device described above. The operation device includes the operation panel for operating the main device and the CPU, which is separated from that of the main device, as described above. The operation device is operated by the CPU independent of the main device and has at least an application having the functions of the registration unit 112 and the display control unit 116 described in the above-described embodiments.

In the above-described embodiment, the image processing apparatus 100 such as an MIT is used as an example. In some embodiments, an "electronic apparatus" having substantially the same functions as the image processing apparatus 100 described above may be used instead of the image processing apparatus 100. For example, the electronic apparatuses may be an office apparatus such as an electronic whiteboard, a teleconference terminal, a projector, or the like. In addition, the electronic apparatus may be a household electric appliance such as a refrigerator or a washing machine, for example.

(3) Program

A control program executed on the image processing apparatus 100 may be provided by storing the program in a computer readable and recording medium, such as a compact disc read only memory (CD-ROM), a flexible disk (FD), a compact disc recordable (CD-R), and a digital versatile disc (DVD) etc., in a file format installable or executable. In addition, it is possible to store the control program executed on the image processing apparatus 100 in a computer connected to a network such as the Internet etc. and provide the program by downloading the program via the network. Furthermore, it is possible to provide and distribute the control program executed on the image processing apparatus 100 through the network such as the Internet etc. It is also possible to provide the control program executed on the image processing apparatus 100 by storing the program in the ROM etc., in advance.

The control program executed on the image processing apparatus 100 has a module configuration that includes each of the functions described above (for example, the authentication unit 111, the registration unit 112, the transmission control unit 115, and the display control unit 116, at least). As hardware, the CPU operates to read the control program from a storage device and executes the control program to load each of the function on the main storage device, and the authentication unit 111, the registration unit 112, the transmission control unit 115, and the display control unit 116 are generated on the main storage device.

According to one of the embodiments, while securing security, it is possible to suppress the interference to user's work.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), DSP (digital signal processor), FPGA (field programmable gate array) and conventional circuit components arranged to perform the recited functions.

Although the embodiments of the disclosure have been described and illustrated above, such description is not intended to limit the disclosure to the illustrated embodiments. Numerous additional modifications and variations are possible in light of the above teachings. It is therefore to be understood that within the scope of the appended claims, the embodiments may be practiced otherwise than as specifically described herein. For example, elements and/or features of different illustrative embodiments may be combined with each other and/or substituted for each other within the scope of this disclosure and appended claims.

What is claimed is:

1. An image processing apparatus, comprising circuitry configured to:
  store, in a memory, primary address information indicating an address of a primary mail server and alternate address information indicating one or more addresses of corresponding one or more alternate mail servers;
  perform authentication of a user;
  transmit, after the authentication of the user succeeds, in response to a first transmission request for transmission of electronic mail by using the primary mail server, the electronic mail by using the primary mail server based on the primary address information stored in the memory;
  in response to a notification indicating that transmission of the electronic mail by using the primary mail server fails, control display of a selection screen for selecting one from the one or more alternate mail servers, based on the alternate address information stored in the memory; and
  transmit, in response to a second transmission request for transmission of the electronic mail by using the alternate mail server, the electronic mail by using the one selected from the one or more alternate mail servers on the selection screen.

2. The image processing apparatus of claim 1, wherein the authentication of the user includes first authentication to authenticate an administrator and second authentication to authenticate a general user, and wherein the circuitry stores, in the memory, the primary address information and the alternate address information according to a user operation performed by the administrator after the first authentication succeeds, and transmits, in response to the first transmission request input by the general user, the electronic mail by using the primary mail server based on the primary address information stored in the memory after the second authentication succeeds.

3. The image processing apparatus of claim 1, wherein, when the one or more alternate mail servers corresponding to the alternate address information are a plurality of alternate mail servers, the circuitry causes a display to display the selection screen to request a user to select the one alternative mail server, and wherein, when the one or more alternate mail servers corresponding to the alternate address information are a single alternate mail server, the circuitry automatically transmits the electronic mail by using the single alternate mail server without displaying the selection screen.

4. The image processing apparatus of claim 1, wherein the circuitry determines whether each of the one or more alternate mail servers corresponding to the alternate address information stored in the memory is communicably connected to the image processing apparatus to be available to transmit the electronic mail, and causes the display to display the selection screen based on the alternate address information according to a determination result, the selection screen including one or more alternate mail servers that are determined to be communicably connected to the image processing apparatus to be available to transmit the electronic mail.

5. The image processing apparatus of claim 1, wherein the circuitry stores, in the memory, for each user, authority information indicating whether the user is authorized to use the one or more alternate mail servers or not, and causes the display to display the selection screen based on the authority information.

6. The image processing apparatus of claim 1, wherein the circuitry stores, in the memory, history information indicating a usage history of each alternate mail server.

7. The image processing apparatus of claim 1, wherein the circuitry includes first circuitry and second circuitry operate independently from each other, the first circuitry being configured to
  perform the authentication of a user,
  transmit the electronic mail, and
  control image forming operation, and the second circuitry being configured to execute an application to
  store, in the memory, the primary address information and the alternate address information, and
  display, on the display, the selection screen.

8. A control method, the method comprising:

storing, in a memory, primary address information indicating an address of a primary mail server and alternate address information indicating one or more addresses of corresponding one or more alternate mail servers;

performing authentication of a user;

transmitting, after the authentication of the user succeeds, in response to a first transmission request for transmission of electronic mail by using the primary mail server, the electronic mail by using the primary mail server based on the primary address information stored in the memory;

in response to a notification indicating that transmission of the electronic mail by using the primary mail server fails, controlling display of a selection screen for selecting one from the one or more alternate mail servers, based on the alternate address information stored in the memory; and transmitting, in response to a second transmission request for transmission of the electronic mail by using the alternate mail server, the electronic mail by using the one selected from the one or more alternate mail servers on the selection screen.

9. A non-transitory recording medium storing a plurality of instructions which, when executed by one or more processors, cause the processors to perform a method, comprising:

storing, in a memory, primary address information indicating an address of a primary mail server and alternate address information indicating one or more addresses of corresponding one or more alternate mail servers;

performing authentication of a user;

transmitting, after the authentication of the user succeeds, in response to a first transmission request for transmission of electronic mail by using the primary mail server, the electronic mail by using the primary mail server based on the primary address information stored in the memory;

in response to a notification indicating that transmission of the electronic mail by using the primary mail server fails, controlling display of a selection screen for selecting one from the one or more alternate mail servers, based on the alternate address information stored in the memory; and transmitting, in response to a second transmission request for transmission of the electronic mail by using the alternate mail server, the electronic mail by using the one selected from the one or more alternate mail servers on the selection screen.

10. The control method of claim 8, wherein the performing of the authentication of the user includes performing a first authentication to authenticate an administrator and performing a second authentication to authenticate a general user, and wherein the storing includes storing, in the memory, the primary address information and the alternate address information according to a user operation performed by the administrator after the performing of first authentication succeeds, and wherein the transmitting includes transmitting, in response to the first transmission request input by the general user, the electronic mail by using the primary mail server based on the primary address information stored in the memory after the performing of the second authentication succeeds.

11. The control method of claim 8, wherein when the one or more alternate mail servers corresponding to the alternate address information are a plurality of alternate mail servers, displaying the selection screen to request a user to select the one alternative mail server, and when the one or more alternate mail servers corresponding to the alternate address information are a single alternate mail server, the transmitting includes automatically transmitting the electronic mail by using the single alternate mail server without displaying the selection screen.

12. The non-transitory recording medium of claim 9, wherein the performing of the authentication of the user includes performing a first authentication to authenticate an administrator and performing a second authentication to authenticate a general user, and wherein the storing includes storing, in the memory, the primary address information and the alternate address information according to a user operation performed by the administrator after the performing of first authentication succeeds, and wherein the transmitting includes transmitting, in response to the first transmission request input by the general user, the electronic mail by using the primary mail server based on the primary address information stored in the memory after the performing of the second authentication succeeds.

13. The non-transitory recording medium of claim 9, wherein when the one or more alternate mail servers corresponding to the alternate address information are a plurality of alternate mail servers, displaying the selection screen to request a user to select the one alternative mail server, and when the one or more alternate mail servers corresponding to the alternate address information are a single alternate mail server, the transmitting includes automatically transmitting the electronic mail by using the single alternate mail server without displaying the selection screen.

* * * * *